United States Patent
Eksombatchai et al.

(10) Patent No.: US 11,256,747 B1
(45) Date of Patent: Feb. 22, 2022

(54) DATA REDUCTION FOR NODE GRAPH CREATION

(71) Applicant: Pinterest, Inc., San Francisco, CA (US)

(72) Inventors: Chantat Eksombatchai, Redwood City, CA (US); Jurij Leskovec, Stanford, CA (US); Zitao Liu, San Francisco, CA (US); Rahul Sharma, Bangalore (IN); Mark Bormann Ulrich, Redwood City, CA (US)

(73) Assignee: Pinterest, Inc., San Francisco, CA (US)

( * ) Notice: Subject to any disclaimer, the term of this patent is extended or adjusted under 35 U.S.C. 154(b) by 400 days.

(21) Appl. No.: 15/870,776

(22) Filed: Jan. 12, 2018

Related U.S. Application Data

(60) Provisional application No. 62/584,702, filed on Nov. 10, 2017.

(51) Int. Cl.
  *G06F 16/00* (2019.01)
  *G06F 16/901* (2019.01)
  *G06K 9/62* (2022.01)
  *G06F 16/958* (2019.01)

(52) U.S. Cl.
  CPC ........ *G06F 16/9024* (2019.01); *G06F 16/958* (2019.01); *G06K 9/6218* (2013.01)

(58) Field of Classification Search
  CPC ............... G06F 16/9024; G06F 16/958; G06F 17/30958; G06F 17/30867; G06F 17/30097; G06K 9/6218; G06Q 10/10
  See application file for complete search history.

(56) References Cited

U.S. PATENT DOCUMENTS

| | | | |
|---|---|---|---|
| 7,640,488 B2 | 12/2009 | Bar-Yossef et al. | |
| 8,069,188 B2 | 11/2011 | Larson et al. | |
| 9,787,705 B1 | 10/2017 | Love et al. | |
| 2012/0005209 A1* | 1/2012 | Rinearson | G06Q 30/02 707/737 |
| 2014/0214814 A1* | 7/2014 | Sankar | G06Q 30/02 707/723 |

(Continued)

OTHER PUBLICATIONS

Agarwal, D. et al., Personalizing LinkedIn feed. In KDD, pp. 1651-1660, 2015.

(Continued)

*Primary Examiner* — Ashish Thomas
*Assistant Examiner* — Suman Rajaputra
(74) *Attorney, Agent, or Firm* — Athorus, PLLC

(57) ABSTRACT

This disclosure describes systems and methods that facilitate reducing a data set that may be used to construct a node graph. For example, the data set may include collections, representations, and associations between the collections and the representations. Topic scores may be determined for the representations, and diversity scores for each collection may be determined based on the topic scores of representations that are associated with the respective collection. If the diversity score is too high, then the collection and its associations are excluded from being incorporated into a node graph that is subsequently constructed from the data set. Topic scores may also be determined for collections in the data set based on the topic scores of representations that are associated with each collection.

20 Claims, 20 Drawing Sheets

(56) References Cited

U.S. PATENT DOCUMENTS

| | | | |
|---|---|---|---|
| 2015/0269231 A1* | 9/2015 | Huynh | G06F 16/951 707/722 |
| 2016/0188713 A1 | 6/2016 | Green | |
| 2017/0337262 A1 | 11/2017 | Smith et al. | |
| 2018/0060355 A1* | 3/2018 | Ruben | G06K 9/626 |
| 2018/0164970 A1 | 6/2018 | Volkerink | |
| 2018/0173699 A1* | 6/2018 | Tacchi | G06F 16/358 |

OTHER PUBLICATIONS

Backstrom, L. and Leskovec, J. Supervised Random Walks: Predicting and Recommending Links In Social Networks. In WSDM, pp. 635-644, 2011.

Baluja, S. et al., Video Suggestion and Discovery for YouTube: Taking Random Walks Through The View Graph. In WWW, pp. 895-904, 2008, https://static.googleusercontent.com/media/research.google.com/en//pubs/archive/34407.pdf.

Bennett, J. and Lanning, S. The Netflix Prize. In KDD Cup and Workshop in Conjunction with KDD, 2007, https://www.cs.uic.edu/~liub/KDD-cup-2007/NetflixPrize-description.pdf.

Covington, P. et al., Deep Neural Networks for YouTube Recommendations. In RecSys, pp. 191-198, 2016, https://cseweb.ucsd.edu/classes/fa17/cse291-b/reading/p191-covington.pdf.

Das, A. et al., Google News Personalization: Scalable Online Collaborative Filtering. In WWW, pp. 271-280, 2007, http://www.www2007.org/papers/paper570.pdf.

Davidson, J. The YouTube Video Recommendation System. In RecSys, pp. 293-296, 2010.

Goel, A. et al., The Who-To-Follow System at Twitter: Strategy, Algorithms, and Revenue Impact, Interfaces, 45(1):98-107, 2015, https://pubsonline.informs.org/doi/pdf/10.1287/inte.2014.0784.

Gong, Jibing, et al., "Integrating a weighted-average method into the random walk framework to generate individual friend recommendations", Science China—Information Sciences, © Science China Press and Springer-Verlag Berlin Germany, vol. 60, Nov. 2017, 22 pages.

Guo, C. et al., "Dynamic Feature Generation and Selection on Heterogeneous Graph for Music Recommendation", Big Data 2016, Washington, DC, Dec. 5-8, 2016, pp. 656-665.

Gupta, P. et al., WTF: The Who to Follow Service at Twitter. In WWW, pp. 505-514, 2013, http://www2013.w3c.br/proceedings/p505.pdf.

Konstas, I. et al., "On Social Networks and Collaborative Recommendation", SIGIR '09, Boston, MA, Jul. 19-23, 2009, pp. 195-202.

Koren, Y. et al., Matrix Factorization Techniques for Recommender Systems. IEEE Computer, 42(8):30-37, 2009.

Lempel, R. and Moran, S., SALSA: The Stochastic Approach for Link-Structure Analysis. ACM Trans. Inf. Syst., 19 (2):131-160, 2001, https://www.researchgate.net/profile/Shlomo_Moran/publication/200110872_SALSA_The_stochastic_approach_for_link-structure_analysis/links/54ade7d30cf24aca1c6f6fb9/SALSA-The-stochastic-approach-for-link-structure-analysis.pdf?origin=publication_detail.

Leskovec, J. and Sosic, R. Snap: A General-Purpose Network Analysis and Graph-Mining Library. ACM TIST, 8 (1):1:1-1:20, 2016, http://delivery.acm.org/10.1145/2900000/2898361/a1-leskovec.pdf?p=50.113.45.197&id=2898361&acc=CHORUS&key=4D4702B0C3E38B35%2E4D4702B0C3E38B35%2E4D4702B0C3E38B35%2E6D218144511F3437&_acm_=1573868801_68301ba2fb8ed08a7789300b03146609.

Li, M. et al., "Grocery Shopping Recommendations Based on Basket-Sensitive Random Walk", KDD '09, Paris, France, Jun. 28-Jul. 1, 2009, pp. 1215-1223.

Li, Rong-Hua, et al., "On Random Walk Based Graph Sampling", AUTO '93, ICDE 2015, Seoul, South Korea, Apr. 13-17, 2015, pp. 927-938.

Linden, G. et al., Amazon.com Recommendations: Item-To-Item Collaborative Filtering. IEEE Internet Computing, 7(1):76-80, 2003, https://www.cs.umd.edu/~samir/498/Amazon-Recommendations.pdf.

Liu, D. et al., Related Pins at Pinterest: The Evolution of a Real-World Recommender System. In WWW, 2017. https://arxiv.org/pdf/1702.07969.pdf.

Sharma, A. et al., GraphJet: Real-Time Content Recommendations at Twitter. PVLDB, 9(13):1281-1292, 2016, http://www.vldb.org/pvldb/vol9/p1281-sharma.pdf.

Vallet, D. et al., "Use of Implicit Graph for Recommending Relevant Videos: A Simulated Evaluation", ECIR 2008, LNCS 4956, Springer-Verlag, Berlin, Germany, © 2008, pp. 199-210.

* cited by examiner

DATA REDUCTION FOR NODE GRAPH CREATION

CROSS-REFERENCE TO RELATED APPLICATIONS

This application claims the benefit of U.S. Provisional Application No. 62/584,702, filed Nov. 10, 2017, entitled "SYSTEMS AND METHODS FOR REDUCING DATA USED TO CONSTRUCT A NODE GRAPH," which is incorporated herein by reference in its entirety.

BACKGROUND

The user experience provided by content discovery applications may depend on the applications' ability to quickly make personalized recommendations relevant to a user's interest. If a user expresses interest in particular content, a content discovery application should be able to react and make high-quality recommendations relevant to the particular content in which the user has expressed interest. If the content discovery application provides irrelevant recommendations to a user, the user experience may be negatively impacted and the user may ignore the recommendations.

The relevance or quality of recommendations provided by the content discovery application can be improved by increasing the complexity of algorithms used to make recommendations. However, increased algorithm complexity may increase the time and computing resources needed to make recommendations. This increased time may cause the user to lose interest in the application for which the recommendation is provided.

The amount of content being considered for potential recommendations and the amount of users handled by the content discovery application compounds the above problems. In addition, miscategorized or inconsistently categorized data may further compound these problems. For example, human users may save various unrelated images to a collection. For example, to save time, by mistake, or due to unfamiliarity, a human user may "save" an image of a classic car to a collection intended for recipes. The association of the car with a recipe collection may lead to the car being recommended to another user that has expressed interest in recipes. Such a recommendation may annoy the user or cause the user to ignore the recommendation. The complexity of the recommendation algorithm may be increased in order to reduce the likelihood that the image of the car will be provided as a recommendation result for a user that has expressed interest in recipes. However, the increased complexity of the algorithm may cause an increased time delay between a user expressing interest in recipes and a recommendation result being provided to the user. This delay may negatively impact the user experience.

In addition, maintaining and generating recommendations from inconsistent or erroneously categorized data may require increased computing resources (e.g., processing and memory). These problems may be compounded for large amounts of human categorized data, e.g., 1+ billion human categorized representations.

Systems and methods are desired that facilitate high-quality relevant recommendations to be provided from a large pool of human-categorized content to many users with minimal delay.

DETAILED DESCRIPTION

Figure 1:
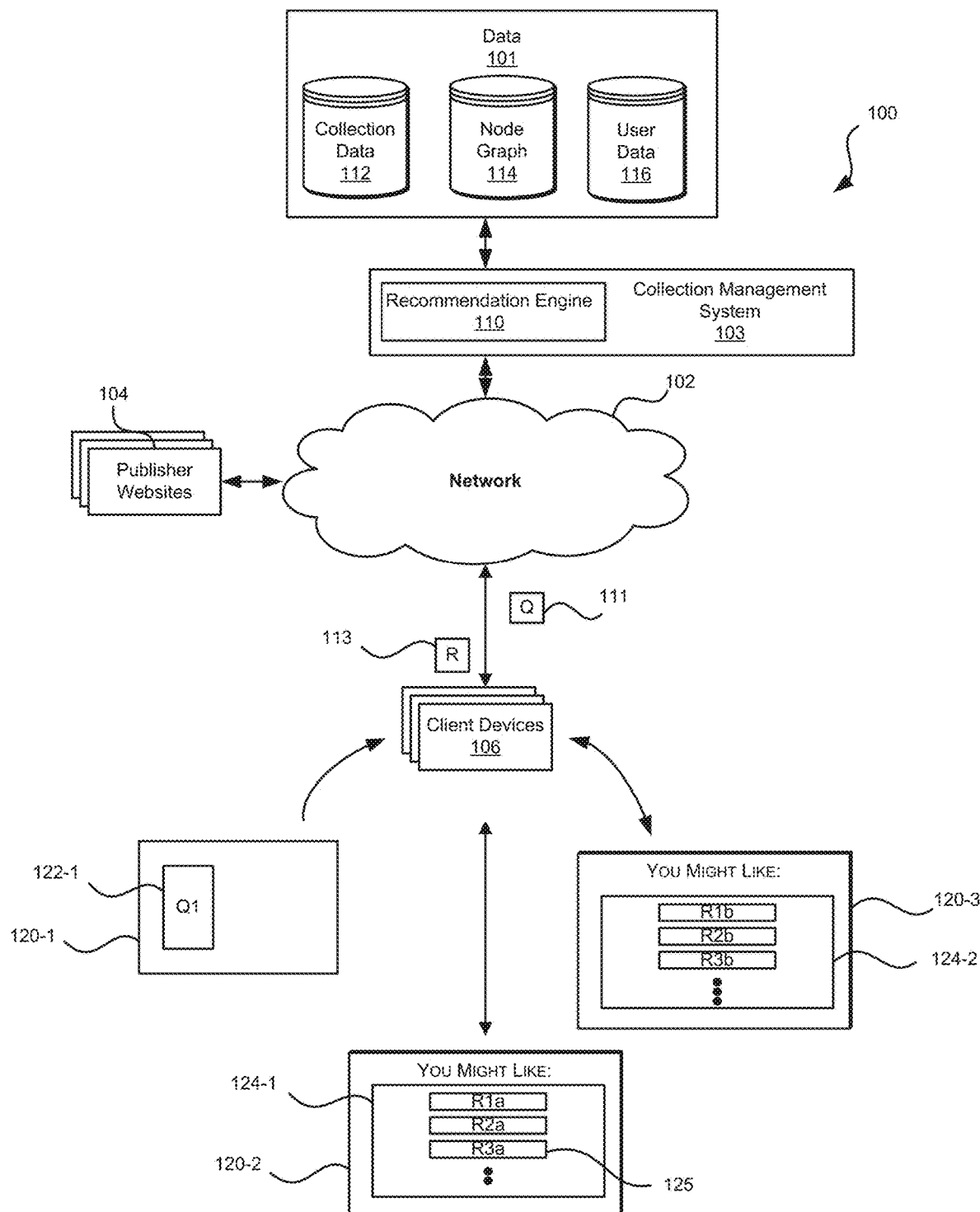
FIG. 1 is a block diagram of an example environment in which a recommendation engine provides recommendation services, according to an implementation.

In one or more implementations disclosed herein, content recommendations may be determined by a recommendation service running a plurality of random walks through a node graph and tracking the nodes visited by the plurality of random walks. The plurality of random walks may be initiated from one or more query nodes in the node graph. Amounts of visits to nodes in the node graph may be tracked by visit count. In some implementations, proximity scores that indicate relevance of nodes with respect to query nodes may be determined based at least in part on the visit counts. In some implementations, content or a collection(s) of content to be recommended to a user may be determined based at least in part on the visit counts or proximity scores. For example, content corresponding to the nodes with the highest visit counts or proximity scores may be recommended to a user. Content may be sent for presentation on a user device, such as a laptop or other computing device.

In some implementations, a node graph may be constructed from a previously constructed node graph. In one or more implementations, the node graph may be constructed from data that includes collections of representations and associations between the collections and the representations. A node graph is constructed to have nodes corresponding to collections, nodes corresponding to representations, and edges corresponding to associations or connections between the collections and the representations.

Representations may include media objects, such as images, video files, sound files, etc. Each representation may be associated with one or more collection and each collection may be associated with one or more representations. Each collection may also be associated with a user. In some implementations, a collection may also be associated with one or more other collections and/or a representation may be associated with one or more other representations. Associations between collections and representation may be designated by users. For example, a user may create a collection for "French cooking" and select images of prepared French dishes and/or images of recipes to be associated with the French cooking collection.

A recommendation service may initiate a recommendation process by running a plurality of random walks through the node graph. The plurality of random walks may be initiated from one or more query nodes in the node graph. Each query node may correspond to a collection or representation in the node graph. A node in the node graph may be determined to be a query node based at least in part on a user for which a recommendation is to be provided expressing interest in a representation or a collection of representations that correspond to the node in the node graph. For example, a user may express interest in a representation or collection by viewing a representation or content associated with the collection, selecting the representation or collection, or adding the representation to a collection.

The quality of recommendations and the amount of computing resources (computing power, cache, memory, etc.) needed to formulate recommendations from a node graph may depend at least in part on topical similarities between representations and their associated collections or a topical diversity of the representations associated with the collection. In some implementations, the data from which the node is to be constructed may include representations and collections that have been erroneously categorized. For example, a user may select to associate a representation of a car with a collection that is associated with representations involving vegetarian food. Running a plurality of random walks through a node graph that models topically diverse collections, or collections that are associated with topically dissimilar representations, may produce inferior recommendations and/or may require additional computing resources (processing and/or memory) compared to running a plurality of random walks through a node graph that models collections that are associated with representations that have a high topical similarity and low topical diversity. To improve the topical similarity and/or topical diversity of a node graph, data from which the node graph is to be constructed may be analyzed and a portion of the data may be identified. The identified portion of the data may be excluded from being incorporated into the node graph. Excluding such data from being incorporated into a node graph may enable a node graph to be constructed that is capable of providing better quality recommendations while requiring fewer computing resources. Example pruning processes are discussed in greater detail below.

In some implementations, a pruning process for excluding data that is used to construct a node graph involves "diversity pruning." Diversity pruning may include obtaining topic scores for representations included in data from which a node graph is to be constructed. Topic scores for representations may be determined, for example, based on textual descriptions or other information that is associated with each representation. A textual description for a representation may be provided, for example, by users and/or a source of the representation. A topic score for the representation may be a probabilistic topic vector for the representation. Diversity scores for collections may be determined based on the topic scores for representations that are associated with each collection. A diversity score for a collection may be an indication of an amount of topical diversity, topical variance, or topical entropy of the representations that are associated with the collection.

As discussed further below, a diversity score may be determined based on a variety of factors, including, but not limited to, topical variance between nodes and/or data represented by nodes, topical entropy between nodes and/or data represented by nodes, moment of distribution of topics between nodes and/or data represented by nodes, etc.

If a diversity score for a collection does not meet a criterion that is indicative of an acceptable amount of diversity for the collection, the collection and/or its associations may be excluded from being incorporated into a node graph that is constructed from the data. As a result, diversity pruning may reduce an amount of collections of topically diverse representations that are incorporated into a constructed node graph.

In some implementations, a pruning process for excluding a portion of data that is used to construct a node graph involves an edge pruning process. An edge pruning process may exclude data that is indicative of associations between collections and representations from being incorporated into a node graph. An edge pruning process may involve obtaining topic scores for collections that are included in the data. A topic score for a collection may be determined based at least in part by obtaining a topic score for each representation that is associated with the collection. Topic scores for representations may be determined, for example, based on textual descriptions and/or other information that are associated with the representations. A textual description that is associated with a representation may be provided by a user or by a source of the representation.

The edge pruning process may involve determining similarity scores that are indicative of topical similarities between collections and one or more representations that are associated with each collection. A similarity score between a collection and a representation may be determined, for example, by determining a cosine similarity of a topic score for the collection and a topic score for a representation that is associated with the collection. If the similarity score does not satisfy a criterion that is indicative of an amount of topical similarity, then an association between the collection and the representation is excluded from being incorporated into a node graph. For example, a node graph will not include an edge that corresponds to the association between the collection and the representation with a similarity score that does not satisfy the criterion. Excluding such edges from being incorporated into a node graph may allow a recommendation service to provide more relevant recommendations in less time and/or with fewer computing resources.

In implementations involving more than one query node from which random walks are initiated, a recommendation service may allocate different "weights" or levels of importance between some or all of the query nodes. Levels of importance between query nodes may be determined, for example, based at least in part on a date that a representation or a collection corresponding to a query node was added or modified, a date associated with the query nodes, or an amount of nodes that are connected to the query node. In some implementations, a date may be associated with each query node and more importance may be allocated to more recent query nodes. In one or more implementations, different weights may be assigned to the query nodes so that one or more query nodes may have a relatively higher or lower influence on the recommendations that are ultimately provided by running the plurality of random walks through the node graph. For example, amounts of walks may be allocated to query nodes so that different amounts of walks are initiated from some or all of the query nodes. In general, the greater the amount of walks that are initiated from a query node, the greater the influence of the query node on the recommendation. For example, given query nodes A and B, the recommendation service may determine that two walks are to be initiated from node A for every one walk initiated from node B. In this example, node A may have a greater influence than node B on the content that is ultimately recommended because nodes around node A may get more visits from random walks than nodes around node B because more walks are initiated from node A.

In some implementations, step lengths indicative of a maximum amount of edges that may be traversed by each random walk may be varied between query nodes. For example, given query nodes A and B, the recommendation service may determine that node A is to have a greater influence than node B on the content that is ultimately recommended. In this example, the recommendation service may allocate ten steps for every walk initiated from node A and five steps for every walk initiated from node B. In this example, node A may have a greater influence than node B on the content that is ultimately recommended because nodes around node A may get more visits from random walks than nodes around node B because the walks from node A may have a greater length.

In operation, individual walks may terminate once one or more conditions have been met. For example, each random walk may terminate after traversing through the node graph a defined amount of steps corresponding to a step length. In one or more implementations, a random walk may terminate after a determination that the random walk has traversed to an end point. An end point for a random walk may be determined where there is no node to traverse to other than a node that has already been visited by the particular random walk. In some implementations, the end point may be a query node. In some implementations, a random walk is restarted from a same query node once an individual random walk has terminated.

In some implementations, the process of running the plurality of random walks through the node graph may terminate once a defined amount of individual random walks have been initiated and terminated. In one or more implementations, the plurality of random walks through the node graph may terminate once a defined amount of nodes in the node graph have visit counts or proximity scores that meet defined criteria. For example, the process of running the plurality of random walks through the node graph may terminate subsequent to a determination that a defined amount of nodes in the node graph have visit counts or proximity scores that meet a defined visit count or a defined proximity score.

In some implementations, a running of a plurality of random walks through the node graph may be modified to favor traversing to certain nodes over other nodes. In such implementations, it will be appreciated that the random walks are not truly random. For example, random walks may traverse the node graph only along edges or to particular nodes that are associated with a defined characteristic. For example, the defined characteristic may include, for example, geographic location, language, a topic score, etc. In one or more implementations, edges that are connected to nodes in the node graph that have a defined characteristic are determined, and random walks may only traverse along these determined edges. For example, if only English language recommendations are desired, the defined characteristic may be English language content. Information, such as user-provided textual descriptions, associated with collections or representations corresponding to the nodes may be analyzed to determine nodes and/or edges that are associated with the English language. In this example, random walks traverse only to nodes or along edges associated with the English language.

The nodes visited by each step through the node graph by a random walk may be tracked and a visit count indicating an amount of visits by random walks to each node may be maintained. In some implementations, a query node of the random walk from which each visit originated may be tracked and maintained, for example, with the visit count. A visit count for a node may be indicative of a relevance of the node to a query. In one or more implementations, proximity scores for nodes in the node graph may be determined based at least in part on the visit counts for the nodes. A proximity score for a node may be indicative of an amount of relevance of the node to the query. In some implementations, the proximity score for a node may be equivalent to the visit count for the node.

In some implementations, a node that has been visited by random walks initiated from different query nodes may have a proximity score that is "boosted" or increased to an amount that is greater than the visit count for the node. This may be done because nodes that have been visited by random walks initiated from two or more different query nodes may be considered more relevant than a node that has only been visited by walks initiated from a single query node.

In some implementations, a cluster of nodes and a target node may be determined from the node graph. For each visit by a random walk to a node included in the cluster, the visit count and/or proximity score for the target node is increased. Clustering allows the visit count or proximity score to be increased for a node even if the node has not been visited by the plurality of random walks. The cluster may be determined based on proximity to the target node in the node graph. For example, for a target node that corresponds to a representation, the cluster may be determined by identifying all collections that are associated with the representation and then identifying a group of representations that are associated with those collections. The group or a subset of the group of representations may be the cluster. The target node may correspond to a representation or a collection that is to have greater priority or weight with respect to other representations or collections. For example, the target node may correspond to an advertisement.

Referring now to FIG. 1, which is a block diagram of an example recommendation environment 100 in which a collection management system 103 manages data 101 and a recommendation engine 110 of the collection management system 103 provides recommendation services. The collection management system 103 may include a network of computer servers. A computer network 102, such as a local area network (LAN), wide area network (WAN), the Internet, or a combination thereof, connects the collection management system 103, publisher websites 104, and client devices 106.

The client devices 106 may include electronic devices such as computers, laptops, tablets, mobile phones and the like that may be used by a plurality of users to interact (e.g., modify or add) with data 101. For example, the client devices 106 may be used by a user to create a collection that is added to the data 101 and/or associate representations with the collection. Users may use the client devices 106 to add a representation from the client device 106 and/or from publisher websites 104 to data 101, and/or to view representations provided by the collection management system 103, other users, and/or other publisher websites 104.

Publisher websites 104 provide representations (e.g., images) that are available via the network 102. The data 101 may include links to representations that are provided by the publisher websites 104. An example publisher website 104 is a collection of web pages formatted in hypertext markup language (HTML) that can contain text, graphic images, multimedia content, and programming elements, such as scripts. Each publisher website 104 may be maintained by an entity that manages and/or owns the website.

The collection management system 103 may include one or more servers that interact with client devices 106 over the network 102. The collection management system 103 may maintain and modify the data 101. The data 101 may include, for example, collection data 112, one or more node graphs 114, and/or user data 116. The collection data 112 may include collections, representations, and related data that may indicate, among other things, associations between representations and collections.

The node graph 114 may be constructed from at least a portion of the collection data 112. The node graph 114 may be a model of data in the collection data 112. Each node of the node graph 114 may correspond to a collection or a representation from the collection data 112. Edges of the node graph 114 that connect different nodes of the node graph correspond to associations between collections and representations. The edges may indicate that a particular representation is associated with particular collections in the collection data 112 or associated with other representations in the collection data 112.

In some implementations, the node graph 114 may be constructed from another node graph. For example, the node graph 114 may be constructed from a previously constructed node graph that has been "pruned" to include fewer edges and/or nodes with respect to the previously constructed node graph. As discussed further below with respect to FIGS. 4-8, nodes and/or edges of a node graph 114 may be pruned from a node graph and, as a result, the collection data 112 represented by those pruned nodes will not be represented by the node graph 114. In one or more implementations where the node graph 114 is constructed from the collection data 112, some collection data 112 may be excluded from being represented by the node graph 114. The node graph 114 may be saved to cache, for example, a cache of the collection management system 103. Saving or storing the node graph 114 to cache may allow for recommendations to be formulated more quickly.

The collection management system 103 may maintain and/or update user data 116. User data 116 may include information about users, such as user interests or information related to past interactions by individuals with the collection management system 103. For example, user data 116 may indicate a history of a user's interactions with data in the collection data 112, the recommendation engine 110, and/or the collection management system 103. For example, user data 116 may indicate representations or collections previously viewed or selected by a user. In one or more implementations, user data 116 may indicate representations that have been recommended to a user and the particular recommended representations that the user has included in the user's collections.

The collection management system 103 may maintain or update collection data 112. The collection data 112 may include, for example, collections, representations, associations between collections and representations, textual descriptions for representations, textual descriptions for collections, and constraints, to name a few. In one or more implementations, data in collection data 112 may be created and/or modified by users or a source of the representation and/or collection. For example, users may create collections and/or modify collections by interacting with the collection management system 103 via client devices 106. For example, users may cause associations to be added to or removed from representations and collections in the collection data 112. In one or more implementations, the collection management system 103 may associate a representation with multiple different collections in response to users requesting to "save" the representation to the collections. In some implementations, users may use the collection management system 103 to create a collection. For example, a user may create a collection for cooking and save representations related to cooking (e.g., images of cooked items, ingredient lists, instructional videos, etc.) to the collection. As discussed in more detail herein with respect to FIG. 2, other data may be associated with representations or collections, such as an identification of a user that created the collection, a context, a textual description, a category, supplemental information, a topic score, and the like.

Representations (also referred to as "media objects") may include word processing documents, portable document format (PDF) documents, images, video, audio, etc. Representations may include content, such as words, phrases, pictures, sounds, and so on, and have associated information such as a description, a link, and/or an image. Representations may be provided by a publisher website 104, a user, another party, etc., and stored in the collection data 112. If the representation is provided by a publisher website 104, a link (e.g., URL) to the publisher website may be included in the collection data 112.

As stated above, a client device 106 may be an electronic device that may be controlled by a user and is capable of interacting with the collection management system 103 over the network 102. Example client devices 106 include personal computers, mobile communication devices, and other devices that can send and receive data over the network 102. A client device 106 typically includes a user application, such as a web browser or "app," to facilitate the sending and receiving of data over the network 102. The user application can enable a user to display and interact with representations located on a web page at a website on the World Wide Web (WWW) or a local area network.

The recommendation engine 110 may obtain a query (also referred to as a "query set") 111 that corresponds to nodes in the node graph 114 from which random walks are to be initiated. The query 111 may refer to objects in the data 101, such as nodes, representations, users, collections, etc. In one or more implementations, the query 111 refers to one or more nodes in the node graph, or the query 111 may refer to one or more representations and/or one or more collections that are selected by a user.

In one or more implementations, the query 111 may be received from a client device 106. For example, the query 111 may refer to one or more representations that are selected by a user of the client device 106. If the query 111 refers to data in the collection data 112, such as collections and/or representations, the nodes in the node graph 114 that correspond to the collections and/or representation may be determined by the recommendation engine 110. In one or more implementations, the query 111 is determined, at least in part, on the user data 116. For example, the query 111 may correspond to representations that the user has previously viewed or added to collections associated with the user, as indicated in the user data 116. In some implementations, the query 111 may be based on an amount of times that a user has viewed particular representations or collections, as indicated by the user data 116. For example, the query 111 may include the most frequently viewed representations for a user. In some implementations, the query 111 may be determined based at least in part on a user inputting a textual search string that is provided to the recommendation engine 110. For example, a user may enter the text "strawberry milkshake" in a search box and client device 106, and the recommendation engine 110 may determine the query 111 based on the entered text.

The recommendation engine 110 may use the node graph 114 to provide to a recommendation or "recommendation set" 113 for the query 111. In particular, the recommendation engine 110 may run a plurality of random walks through the node graph 114 and track visit counts for nodes of the node graph 114. A visit count for a node is indicative of the number of times the node was visited by the plurality of random walks.

The plurality of random walks may be initiated from nodes in the query 111, referred to herein as query nodes. A relevance or proximity of nodes in the node graph with respect to the query 111 may be indicated or determined based on the visit counts for each node. A recommendation 113 may be determined by the recommendation engine 110. The recommendation 113 may refer to content (e.g., representations) in the collection data 112 that corresponds to nodes in the node graph 114. For example, representations in the collection data 112 corresponding to the nodes in the node graph with the highest visit counts may be included in the recommendation 113. The recommendation 113 may be sent to the client devices 106 for presentation. The recommendation 113 may be provided to client devices 106 in various ways such as email, text message, news feed, and/or sending representations (e.g., images) of the recommendation 113 for display via an application, etc.

Still referring to FIG. 1, in one or more implementations, a first presentation 120-1 of a representation 122-1 is presented on a display of a client device 106. The representation 122-1 may be selected by a user via a client device 106 and included in a query 111 that is provided to the recommendation engine 110. For example, the user may select the first representation 122-1 to indicate that the user desires to view recommended content that is similar to the representation 122-1. After receiving the query 111, the recommendation engine 110 may determine a node in the node graph 114 that corresponds to the representation 122-1. This node may be a query node from which a plurality of random walks through the node graph 114 may be initiated to formulate a recommendation 113. Based on the results of the random walks, the recommendation engine 110 may then determine the recommendation 113 that is provided to the client device 106 for presentation. The recommendation 113 may include a first plurality of representations 124-1 that are included in a second presentation 120-2 by the client device 106. The user may continue to refine the query or submit an addition query based on the recommendation. For example, a representation R3A 125 of the first plurality of representations 124-1 may be selected and included in a query 111 that is provided to the recommendation engine 110. The recommendation engine 110 may determine a node in the node graph 114 that corresponds to the representation R3A 125 that is a query node from which a plurality of random walks through the node graph 114 may be initiated. Based on the results of the plurality of random walks, recommendation engine 110 may determine a recommendation 113 that is provided to the client device 106 and presented in third presentation 120-3 of a second plurality of representations 124-2 by the client device 106. In some implementations, this process may continue with further queries 111 being provided to the recommendation engine 110 and recommendations 113 being determined by the recommendation engine 110 and sent to the client device 106 for presentation.

Figure 2:
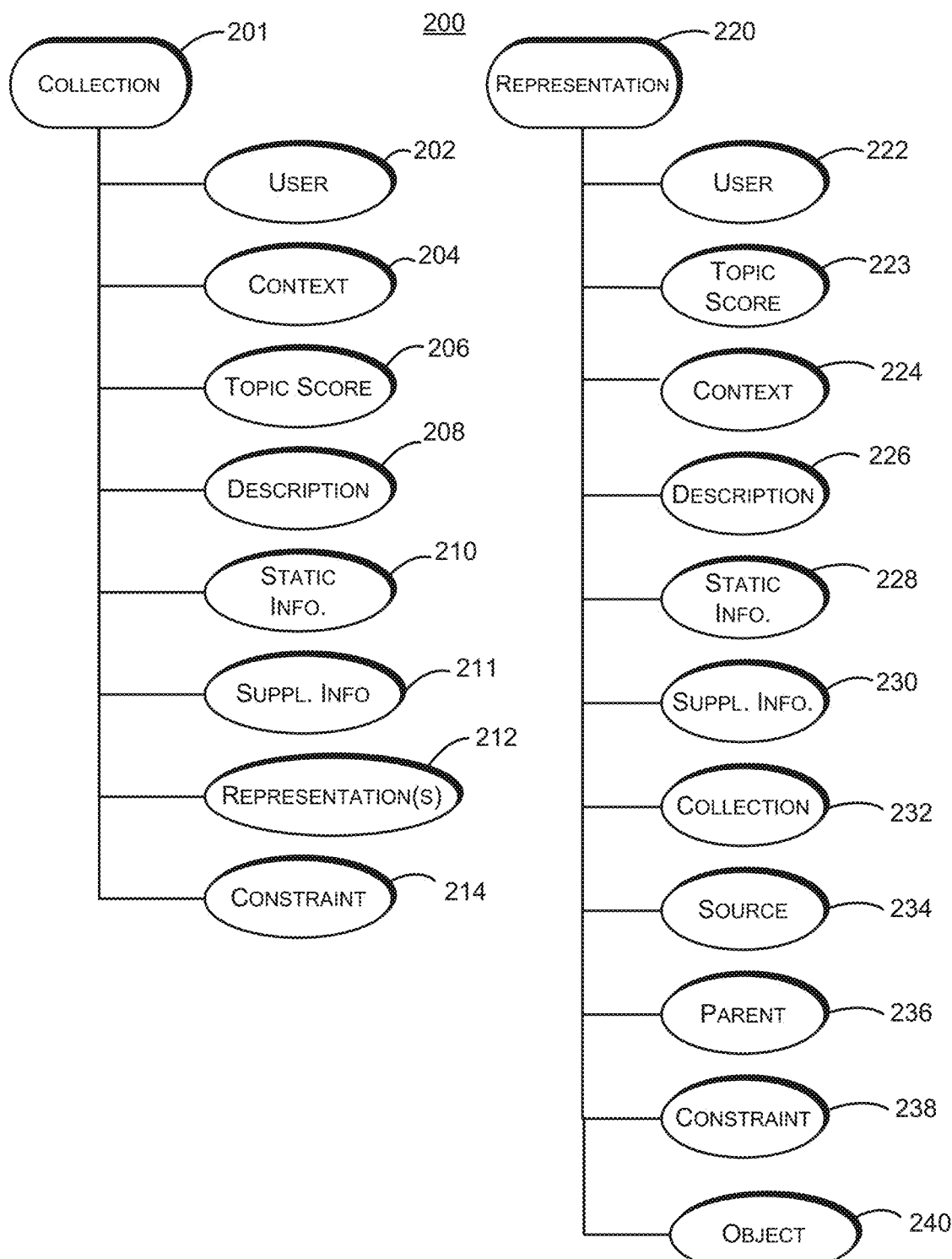
FIG. 2 is a block diagram of example collection data, according to an implementation.

Referring now to FIG. 2, which is a block diagram representing example collection data 200, such as collection data 112 of FIG. 1. The collection data 200 may include at least one collection 201 and at least one representation 220. The collection 201 and the representation 220 may be associated with each other.

The collection 201 may include or be associated with user data 202 that may indicate, for example, a user that created the collection 201 and/or any user(s) identified as allowed to add or remove representations to the collection 201. In addition, the collection 201 may include context data 204 that may indicate a context for the collection 201. The context data 204 may be selected by a user or determined by a collection management system, such as the collection management system 103 of FIG. 1. The context data 204 may indicate a user-specific meaning for the collection 201, for example, "birthday gifts 2014." In this example, the context data 204 indicates the collection is for items that the user has previously received. In another example, context data 204 may indicate gifts that are desired by a user.

The collection 201 may include or be associated with topic score data 206 indicating a topic or topics to which the collection pertains. The topic score data 206 may include probabilistic topic vectors that are indicative of topic scores of representations associated with the collection 201. For example, the topic score data 206 for the collection 201 may indicate individual topic scores of one or more associated representations, such as representation 220. The topic score data 206 for the collection 201 may be determined, for example, by analyzing data associated with the topic scores of representations associated with the collection 201. In one or more implementations, the topic scores may be determined by running a (Latent Dirichlet Allocation) LDA topic model on a textual description for the collection and/or representations associated with the representation. In some implementations, the topic scores may be determined by identifying an object that is represented by the representation.

The topic score data 206 for the collection 201 may be based on topic scores for representations associated with the collection 201. For example, the topic score data 206 for the collection 201 may indicate amounts of content categories that are included in the collection 201. The topic score data 206 may indicate an amount of content in particular categories. For example, the topic score data 206 for the collection 201 may indicate amounts of content related to certain categories, such as animals, books, arts and entertainment, sports, food and drink, etc. The topic scores may be determined by a collection management system and may be independent of a category assigned to the collection 201 by the user. In some implementations, the representation(s) included in the collection 201 and/or data associated with the representation(s) are processed to determine content categories in the collection 201. For example, if the collection 201 includes a representation of a milkshake and a representation of a horse, the topic score for the collection 201 may be 50% of a "food" content category and 50% of an "animals" content category. In one or more implementations, the topic score data 206 may include a diversity score for the collection or one or more similarity scores that represent topical similarities between the collection and representations associated with the collection 201.

The collection 201 may include description data 208 that indicates a description of the collection 201. The description data 208 may be from a user's perspective. For example, the description data 208 may be provided by a user that created the collection 201. For example, the description data 208 may include a textual description provided by the user, e.g., "French Cooking" for a collection directed to cooking French cuisine. In one or more implementations, the description data 208 includes comments on the collection 201 as posted by users. The description data 208 may be used to determine topic score data 206 and/or context data 204.

Static information 210 may also be associated with the collection 201. Static information 210 may include information provided by the creator of the collection 201 and/or other users of the collection management system. A collection management system may automatically incorporate certain information into the static information 210 that is relevant to the collection 201 based on the selected category and, optionally, the provided description data 208. For example, other users may view, comment and/or otherwise provide feedback with respect to the collection 201. Comments and/or other feedback from the creator and/or other users may be associated with the collection 201 and maintained as static information 210.

Supplemental information 211 may also be associated with the collection 201. Supplemental information 211 may be any form of information or action provided by a source of one or more representations associated with the collection 201, a source of the collection 201, or any other external source. For example, if the description data 208 of the collection 201 is about Hawaii, supplemental information 211 for the collection 201 may include weather condition information for Hawaii that is provided from a weather service from Hawaii.

The collection 201 may include or be associated with representation information 212 that indicates representations that are associated with the collection 201. A user may select to add or remove a representation to or from the collection 201 and the representation information 212 may be updated accordingly. Edges in a node graph generated from the collection data 200 may correspond to the representation information 212.

Constraints 214 may also be associated with the collection 201 and used to control access, modification or other aspects of the collection 201. The constraints 214 may indicate who can view the collection 201, remove representations from the collection 201, and/or whether users can comment on the collection 201, etc. For example, the constraints 214 may be specified by a creator of the collection 201 or a source of a representation included in the collection 201.

Collection data 200 may be associated with one or more representations 220. Each representation(s) 220 may include, for example, one or more word processing documents, portable document format (PDF) documents, images, video, audio, to name just a few. Each representation 220 may include content, such as words, phrases, pictures, sounds, and so on, or a link to such content. Each representation 220 may be associated with information such as a description, a link, and/or an image. Representations 220 may be provided by a publisher website and may be stored in the collection data 200. If the representation 220 is provided by a publisher, a link (e.g., URL) to the publisher website may be associated with the representation 220.

The representation 220 may be associated with user data 222 that may indicate, for example, a user that created, saved, or uploaded the representation 220, a user or users that are allowed to add or remove the representation 220 to a collection, and/or a user or users that are allowed to comment or add annotations to the representation.

The representation 220 may be associated with a topic score 223 indicating a topic or topics with which the representation pertains. For example, the topic score 223 may be determined by analyzing a textual description provided by a user or content of the representation 220, and/or determined based at least in part on an identification of an object that is included in or represented by the representation 220. The topic score 223 of the representation 220 may indicate relative amounts of content categories for the representation 220. For example, the topic score 223 for the representation 220 may indicate amounts of content related to certain categories, such as animals, books, arts and entertainment, sports, food and drink, etc. For example, a representation of Halloween-themed milkshake with a user-provided description of "Halloween milkshake" may have a topic score 223 that indicates a 50% topic score for a "food" content category and a 50% topic score for a "Halloween" content category. In one or more implementations, the topic score 223 for the representation 220 may be determined by running an LDA topic model on data associated with the representation (e.g., description data 226) to obtain a probabilistic topic vector that is maintained as the topic score 223.

In addition, the representation 220 may be associated with context data 224 that may indicate a context for the representation 220. The context data 224 may be selected by a user or determined by a collection management system, such as the collection management system 103 of FIG. 1. The context data 224 may indicate a user-specific meaning for the representation 220. For example, the context data 224 for a representation of a house may be "2018 personal goals" for a user who aspires to buy a house in the year 2017, or "architecture" for a user interested in the architecture of the house in the representation. The context data 224 may be determined, for example, by analyzing a textual description provided by a user for the representation 220.

The representation 220 may be associated with description data 226 for the representation 220 that provides a description for the representation 220. The description data 226 may be a textual description that is provided by a user or a source of the representation 220. The description data 226 may be from a user's perspective and/or specific to a user indicated by the user data 202. In one or more implementations, the description data 226 for the representation 220 includes comments regarding the representation 220 as posted by one or more users. The description data 208 may be used to determine topic score data 223 and/or context data 224 for the representation 220.

The representation 220 may be associated with static information 228. Similar to the static information 210 for the collection 201, static information 228 for the representation 220 may be associated with the representation 220 by a collection management system. For example, if a user has selected a representation 220 of the collection data 200 that is already known to the collection management system, existing information about the representation may be included in the static information 228. Other static information 228 about the representation 220 may include comments or textual descriptions provided by other users of a collection management system, a creator of the representation 220, or a source of the representation 220, etc.

In some implementations, supplemental information 230 may be associated with the representation 220. Supplemental information 230 may be any form of information or action provided by a source of the representation 220 or an external source. For example, the source of the representation 220 may provide information about the representation 220 while other external sources may provide actions relevant to the representation 220. For example, if the representation 220 is an image of a television, a source of the television may be the manufacturer, such as Sony, and that source may provide information about the television. In this example, the information about the television provided by the manufacturer may include the dimensions, resolution, weight, etc. Other external sources, such as sellers of the television, may provide supplemental information 230 that may be associated with the representation 220. For example, sellers of objects depicted in the representation 220 may provide actions that allow a user viewing the representation 220 to obtain information or to initiate a purchase of an object depicted by the representation 220, or to obtain information about an external source that is offering the object for sale, etc.

The representation 220 may also be associated with collection information 232 that indicates one or more collections in the collection data 200 that include or are associated with the representation 220. In some implementations, the representation 220 is associated with multiple different collections. As users add or remove the representation 220 from collections, the collection information 232 may be updated by a recommendation service. In some implementations, the representation 220 may be included in hundreds of different collections, where each collection is associated with a different user.

The representation 220 may also be associated with source information 234 that indicates, for example, a source from which the representation 220 was obtained or a source of an object that is represented in the representation 220. For example, the source information 234 may specify a website from which the representation 220 was retrieved or is currently available to be retrieved. In one or more implementations, the source information 234 includes a URL of a website where an image of the representation may be obtained. Parent data 236 may indicate a collection for which the representation was obtained, if the representation 220 was based upon and/or created from the collection. For example, if the representation was added to a first collection from a second collection, the parent data 236 for the representation may indicate the second collection.

The representation 220 may be associated with constraint 238 that may be used to control access, modification or other aspects of the representation 220. For example, a creator of the representation 220 may specify whether the representation 220 can be viewed by other users, copied into other collections, whether users can comment on the representation 220, etc.

Finally, an object 240 may be associated with the representation 220 and may be indicative of an object represented or included in the representation 220. For example, the object 240 may be Sony 54-inch plasma television for a representation 220 that depicts such a television. In another example, the object 240 may be Eiffel Tower for a representation that is an image of the Eiffel Tower. In another example, the representation includes a video of Lake Tahoe, and the object 240 may be Lake Tahoe or coordinates that indicate a specific location of Lake Tahoe where the video was captured. The object 240 may be specified by a source of the representation 220 or a user, or determined by analyzing the content of the representation 220 or the description data 226 for the representation 220.

In operation, a recommendation engine may use a node graph that is constructed from collection data 200 (collections and representations) to formulate recommendations in response to queries. The node graph may be a model of collections and representations from collection data 200, and associations between the collections and the representations. For example, the node graph may be a bipartite graph model. The node graph may be traversed by a plurality of random walks that are initiated from one or more query nodes corresponding to a query. The nodes visited by the random walks may be tracked and a proximity score may be determined that is indicative of the relevance of nodes with respect to the query set. Recommended representations and/or collections may be determined based on visit counts or proximity scores. The recommended representations and/or collections may be provided to a user.

Figure 3:
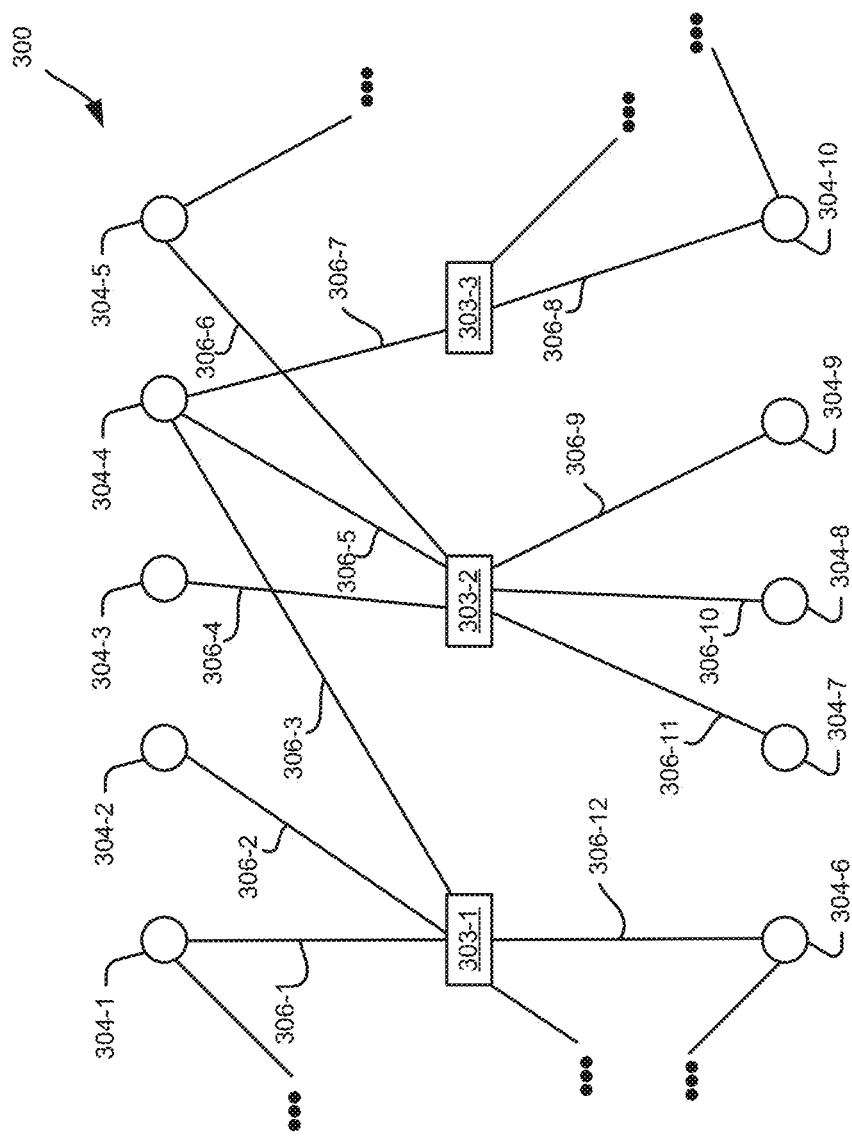
FIG. 3 is a block diagram illustrating a portion of an example node graph formed from collection data, according to an implementation.

Referring now to FIG. 3, which illustrates an example of a portion of a node graph 300 that may be constructed from and that may model a portion of collection data, such as collection data 200 discussed above with respect to FIG. 2. The portion of the node graph 300 includes first nodes 303-1, 303-2, and 303-3 and second nodes 304-1 through 304-10. In this example, first nodes 303-1, 303-2, and 303-3 correspond to collections in the collection data and second nodes 304-1 through 304-10 correspond to representations (e.g., images, video, audio, etc.) in the collection data.

In addition, the portion of the node graph 300 contains edges 306-1 through 306-12 that connect first nodes and second nodes. Edges in a node graph may be determined based on associations between first nodes and second nodes as indicated in collection information 232 or representation information 212 discussed in connection with FIG. 2. Edges connecting first nodes and second nodes may correspond to representations and collections as indicated in collection data, such as collection data 200.

A second node 304 may be connected to multiple first nodes 303. For example, second node 304-4 may be connected to first nodes 303-1, 303-2, and 303-3. This indicates that the representation corresponding to second node 304-4 is included in the collections represented by first nodes 303-1, 303-2, and 303-3. In one or more implementations, the node graph 300 may contain no edges that connect two first nodes to one another and/or two or more second nodes to one another.

In one or more implementations, representations are associated with (or "included in") collections by user inputs. For example, a connection between a representation in the collection data and a collection in the collection data may be established by a human user "saving" or otherwise indicating that the representation is to be associated with the collection. Edge 306-1 is an example of a connection between a first node 303-1 for a collection and a second node 304-1 for a representation. Edge 306-1 may indicate that in the collection data from which node graph 300 is generated or constructed, there is an association between a representation and a collection, or the representation represented by second node 304-1 has been included in the collection represented by first node 303-1.

Still referring to FIG. 3, edges 306-1, 306-2, 306-3, and 306-12 connect first node 303-1 with second nodes 304-1, 304-2, 304-4, and 304-6, respectively. Edge 306-1 corresponds to an association between a representation in the collection data corresponding to second node 304-1 being associated with a collection in the collection data corresponding to the first node 303-1. In addition, edges 306-2, 306-3, and 306-12 correspond to associations between representations in the collection data corresponding to second nodes 304-2, 304-4, and 304-6 being associated with the first node 303-1 corresponding to a collection in the collection data.

In addition, edges 306-4, 306-5, 306-6, 306-9, 306-10, and 306-11 connect first node 303-2 to second nodes 304-3, 304-4, 304-5, 304-7, 304-8, and 304-9. Edges 306-4, 306-5, 306-6, 306-9, 306-10, and 306-11 correspond to associations between representations in the collection data corresponding to second nodes 304-3, 304-4, 304-5, 304-9, 304-8, and 304-7 being associated with in the first node 303-2 corresponding to a collection in the collection data.

Furthermore, edges 306-7 and 306-8 connect first node 303-3 to second nodes 304-4 and 304-10, respectively. Edges 306-7 and 306-8 correspond to associations between representation in the collection data corresponding to second nodes 304-4 and 304-10, respectively, being included in the first node 303-3 corresponding to a collection of the collection data.

In operation, a recommendation process that may be performed, for example, by a recommendation engine, such as the recommendation engine 110 of FIG. 1, may simulate a plurality of random walks along the node graph 300 that are initiated from a second node that is included in a query Q and record a number of times (visit count) the simulated walks visit each of the second nodes X. In one or more implementations, the representations in the collection data that correspond to the second nodes X with the highest visit counts V may be output as recommendations. In one or more implementations, the representations in the recommendation may be sent to a client device for presentation.

If associations between collections and representations in the collection data from which a node graph is constructed are provided by human users, some collections may be associated with topically dissimilar or topically diverse representations due to human error or otherwise. For example, a user may include diverse and unrelated representations in a collection by accident or due to lack of familiarity with an object management system. For example, a user may inadvertently include a car in a collection for recipes, and the car may be recommended in response to a query that includes nodes corresponding to representations connected to the recipe collection. Some users may include various topically unrelated representations (recipe, straw hat, golf club, classic muscle car, and a hamburger) in a collection. Incorporating such a collection of topically diverse representations into a node graph would negatively impact the recommendations that may be provided using the node graph.

The relevance and quality of recommendations that may be generated by running random walks through the node graph may be improved if the collections included in node graph are associated with topically similar representations and/or representations with low topical diversity. Utilizing node graphs that include collections of topically dissimilar or topically diverse representations to formulate recommendations may lead to irrelevant or low quality recommendations being provided to the user. Because topical dissimilarity between collections and representations and collections of topically diverse representations may have negative impacts on recommendations and system performance, it may be desirable to generate a node graph with reduced topical dissimilarity, or reduced diversity, with respect to collections and associated representations.

Figure 4:
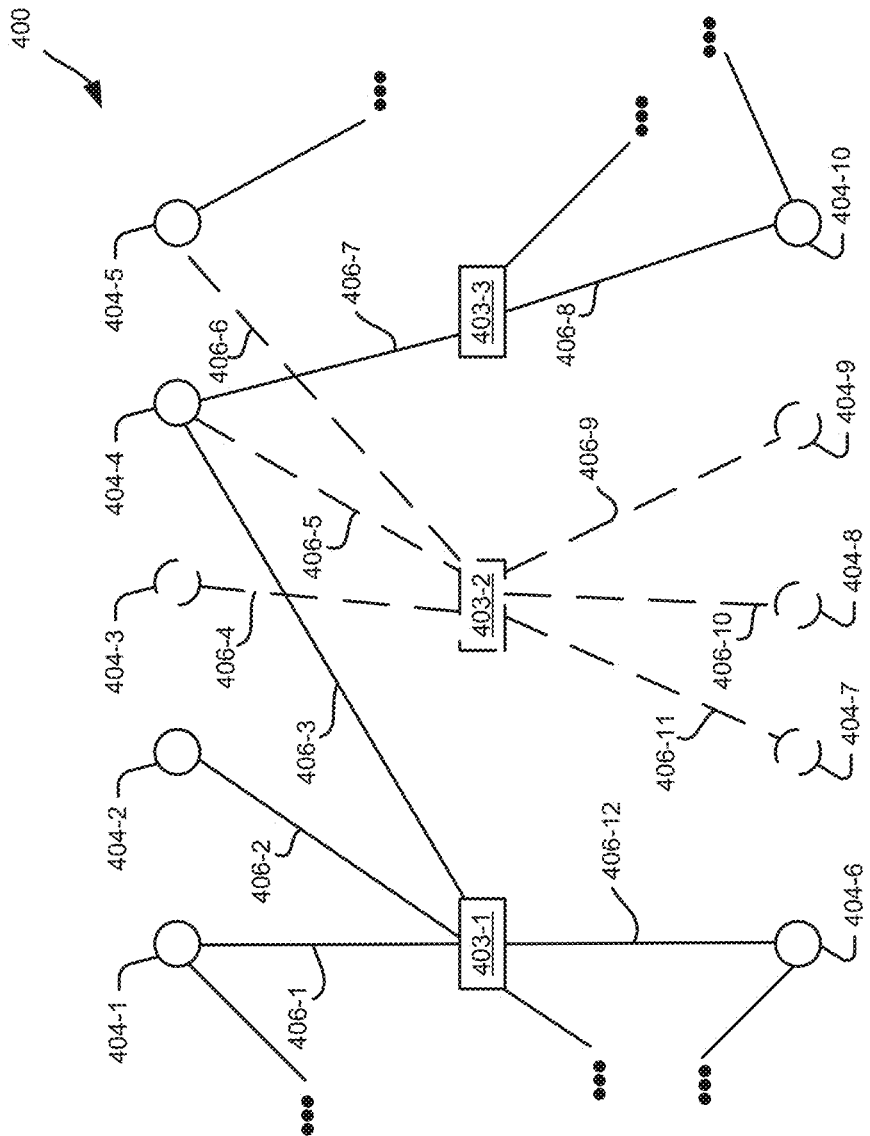
FIG. 4 is a block diagram illustrating a portion of an example node graph formed from collection data that has been diversity pruned, according to an implementation.

FIG. 4 illustrates an example of a portion of a node graph 400 that has been generated from data that has been "pruned" so that certain data is not incorporated into the node graph 400. In the example illustrated by FIG. 4, the data from which the portion of the node graph 400 has been constructed may be a diversity pruned version of the data from which the portion of the node graph 300 of FIG. 3 is constructed. Therefore, FIG. 4 may include similar first nodes, second nodes, and edges as those discussed in connection with FIG. 3 and, for purposes of brevity the nodes and edges depicted in FIG. 4 will not be described in detail with regard to FIG. 4. Specifically, first nodes 403-1, 403-2, and 403-3 correspond to first nodes 303-1, 303-2, and 303-3 of FIG. 3, respectively. Second nodes 404-1, 404-2, 404-3, 404-4, 404-5, 404-6, 404-7, 404-8, 404-9, and 404-10 correspond to second nodes 304-1, 304-2, 304-3, 304-4, 304-5, 304-6, 304-7, 304-8, 304-9, and 304-10 of FIG. 3, respectively. Edges 406-1, 406-2, 406-3, 406-4, 406-5, 406-6, 406-7, 406-8, 406-9, 406-10, 406-11, and 406-12 correspond to edges 306-1, 306-2, 306-3, 306-4, 306-5, 306-6, 306-7, 306-8, 306-9, 306-10, 306-11, and 306-12 of FIG. 3, respectively.

Still referring to FIG. 4, first node 403-2, second nodes 404-3, 404-7, 404-8, and 404-9, and edges 406-4, 406-5, 406-6, 406-9, 406-10, and 406-11 are shown with dotted lines to indicate that these portions would have been incorporated into the portion of the node graph 400 but for a diversity pruning process being applied to the data from which the portion of the node graph 400 is constructed. Diversity pruning involves excluding topically diverse collections and their associations to representations from being incorporated into the construction of a node graph. Example diversity pruning processes that may result in the portion of the node graph 400 being constructed as shown in FIG. 4 are discussed in detail in connection with FIG. 7. For example, the diversity pruning process may remove topically diverse first nodes and their edges or data corresponding to topically diverse first nodes and/or their edges. For example, a diversity score for a collection corresponding to first node 403-2 may be determined based at least in part on topic scores for representations corresponding to second nodes 404-3, 404-4, 404-5, 404-7, 404-8 and 404-9 that are connected to the first node 403-2. The diversity score for the collection may be indicative of an overall topical diversity of representations that are associated with the collection. If the determined diversity score for the collection does not meet a criterion, then data corresponding to the collection and/or associations with representations is excluded from the construction of the node graph. For example, as part of the diversity pruning process, a collection corresponding to first node 403-2 may be determined to have a diversity score that does not meet a criterion and thus a collection corresponding to first node 403-2 and its associations to representations may be excluded from being incorporated into the node graph 400. In the present example, first node 403-2 has been determined to have a diversity score that does not satisfy a diversity score criterion. In the example shown by dotted lines in FIG. 4, the first node 403-2 and edges 406-4, 406-5, 406-6, 406-9, 406-10, and 406-11 are not included in the portion of the node graph 400 after a pruning process has been applied to the data shown in FIG. 3. In some implementations, collections or associations between collections and associations that are older than a defined age may be determined to not meet the criterion and be excluded from being incorporated into the node graph.

In some implementations, representations may be excluded from being incorporated into a node graph. For example, representations that were created prior to a defined date may be determined to not meet a criterion and may be excluded from being incorporated into a node graph. In one or more implementations, representations that are not associated with any collection are excluded from being incorporated into the node graph 400. Such representations that are not associated with any representations that would be of little use in running random walks because there is no node to which to traverse. For example, second nodes 404-3, 404-7, 404-8, and 404-9 are not included in the node graph 400 because the corresponding representations have been excluded from being incorporated into the portion of the node graph 400. In comparison, second node 404-4 may remain in the node graph 400 even though the second node 404-4 is connected to the first node 403-2. In this example, second node 404-4 is retained because second node 404-4 is also connected to first node 403-1 by edge 406-3.

In comparison to the portion of the node graph 300 shown in FIG. 3, the portion of the node graph 400 may allow for faster and/or more relevant recommendations to be formulated from queries. In addition, the portion of the node graph 400 may have a reduced memory footprint compared to the portion of the node graph 300 shown in FIG. 3. For example, and as discussed, random walks through the pruned node graph 400 will return more relevant recommendations because nodes that do not satisfy a criterion have been removed (pruned).

Figure 5:
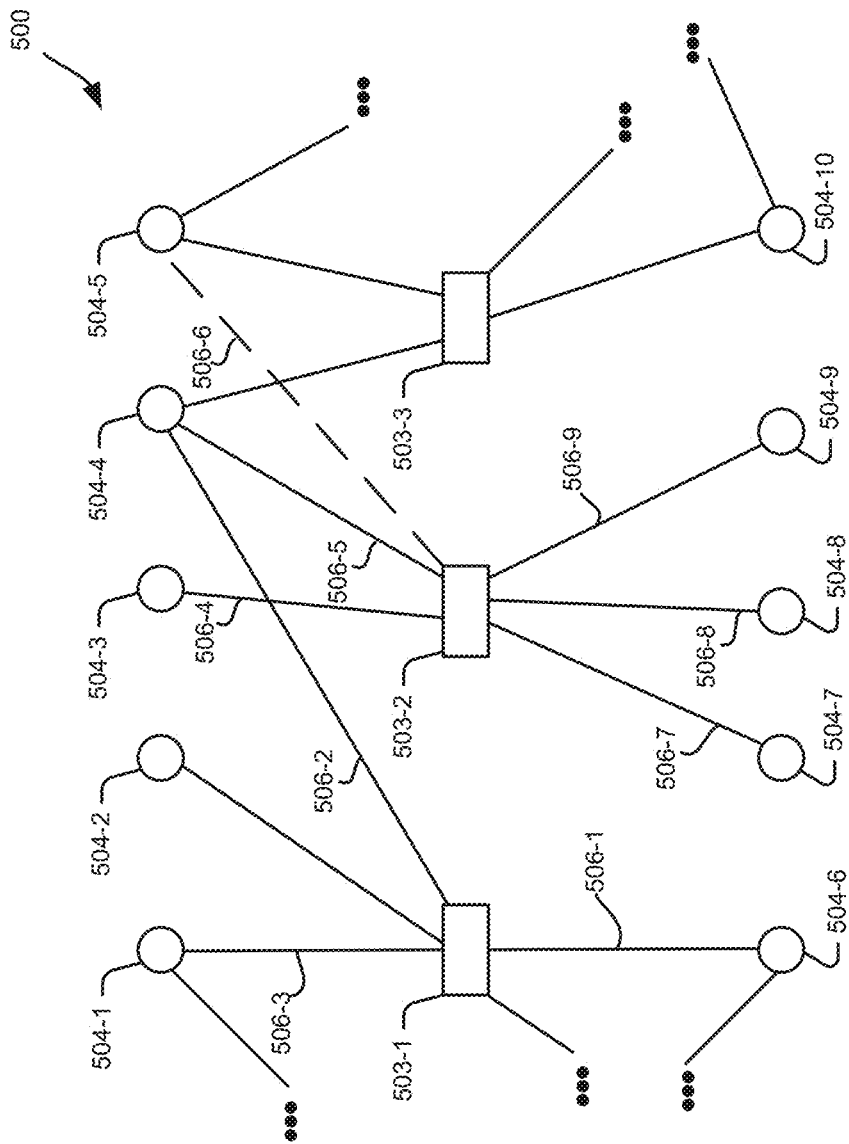
FIG. 5 is a block diagram illustrating a portion of an example node graph generated from collection data that has been edge pruned, according to an implementation.

FIG. 5 illustrates a portion of a node graph 500 generated from data that has been pruned so that certain data is not incorporated into the node graph 500. In the example illustrated by FIG. 5, the data from which the portion of the node graph 500 has been constructed may be an edge pruned version of the data from which the portion of the node graph 300 of FIG. 3 is constructed. Therefore, FIG. 5 may include similar first nodes, second nodes, and edges as those discussed in connection with FIG. 3 and, for purposes of brevity the nodes and edges depicted in FIG. 5 will not be described in detail with regard to FIG. 5.

Specifically, first nodes 503-1, 503-2, and 503-3 correspond to first nodes 303-1, 303-2, and 303-3 of FIG. 3, respectively. Second nodes 504-1, 504-2, 504-3, 504-4, 504-5, 504-6, 504-7, 504-8, 504-9, and 504-10 correspond to second nodes 304-1, 304-2, 304-3, 304-4, 304-5, 304-6, 304-7, 304-8, 304-9, and 304-10 of FIG. 3, respectively. Edges 506-1, 506-2, 506-3, 506-4, 506-5, 506-6, 506-7, 506-8, 506-9 correspond to edges 306-1, 306-2, 306-3, 306-4, 306-5, 306-6, 306-9, 306-10, 306-11, and 306-12 of FIG. 3.

Dotted lines indicate an edge that would have been included in the node graph 500 but for the pruning process. Specifically, edge 506-6 between first node 503-2 and second node 504-5 has been excluded from the node graph 500. Edge pruning involves excluding associations between collections and dissimilar representations from being incorporated into the construction of a node graph. Edge pruning involves obtaining a topic score for a collection and obtaining a topic score for a representation associated with the collection. A topical similarity for the collection and the representation may be determined, for example, based at least in part on a cosine similarity between the topic score for the collection and the topic score for the representation. If the determined topic similarity does not meet a criterion, then the association between the representation and the collection is excluded from being incorporated into a node graph. An example edge pruning process that may result in the node graph 500 is discussed in detail in connection with FIG. 8.

Figure 6:
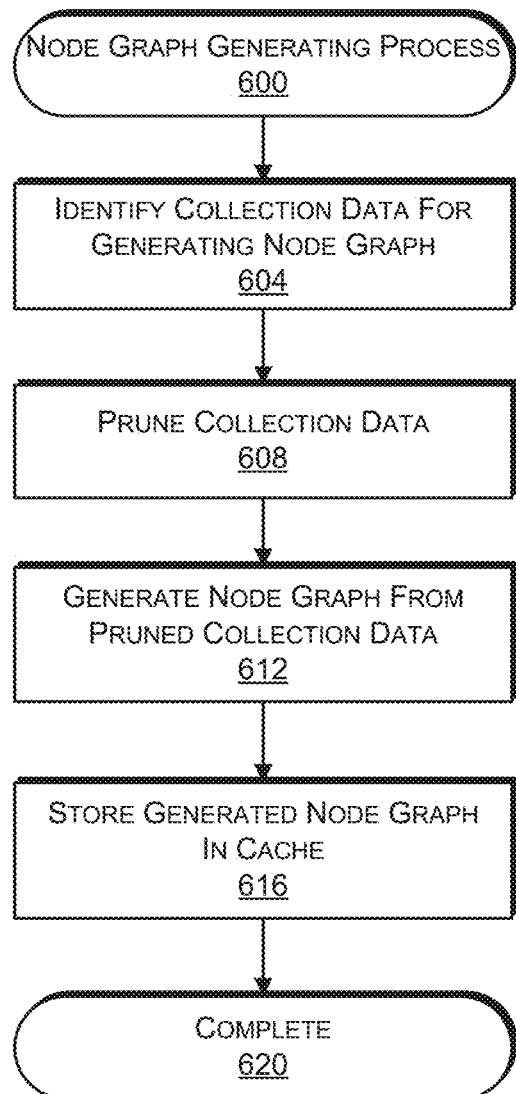
FIG. 6 is a flow diagram illustrating an example process for generating a node graph, according to an implementation.

FIG. 6 illustrates an example node graph generation process 600, according to an implementation. The example process 600 and each of the other processes described herein are illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, solid-state drives, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation, and any number of the described operations can be combined in any order and/or in parallel to implement the process. Likewise, additional or fewer operations than those described may be utilized with the various implementations described herein.

The example process 600 begins by identifying data, a data set, or a corpus from which a node graph is to be generated, as in 604. In some implementations, the data from which a node graph is formed may include a collection data set, such as collection data 200 discussed in connection with FIG. 2. The data may include representations, collections, associations between the representations and collections, and data related to the collections and representations. In one or more implementations, the data may be a previously constructed node graph.

In some implementations, the example process 600 is initiated in response to an administrator of a collection management system, such as the collection management system 103 of FIG. 1, submitting a request for a node graph to be constructed or updated. Alternatively, in one or more implementations, node graphs are automatically constructed on a periodic basis. For example, a node graph may be automatically generated each day from collection data or a previously constructed node graph in order to provide an updated node graph that incorporates changes made by users to the collection data subsequent to a node graph being constructed from the collection data.

Upon receiving the data (e.g., collection data) for constructing a node graph, the data may be pruned, as in 608. Pruning the data may involve excluding collections with high diversity and/or associations between topically dissimilar collections and representations from being incorporated into a node graph that is constructed from the data. Example pruning processes that may be utilized with the disclosed implementations are described in more detail in FIGS. 7 and 8. The pruning processes may result in a pruned data set and/or pruned node graph, where one or more collections, representations, and/or associations between collections and representations are excluded from being incorporated into the node graph.

In some implementations, the data may be pruned by excluding collections, representations, or associations between collections and representations based on their creation date or modification dates. For example, collections, representations, or associations between collections and representations that were created or modified more than a defined time period before a present time may be excluded from being incorporated into a node graph. In some implementations, an association between a collection and a representation that was made greater than a defined amount of time (e.g. two years) may be excluded from a node graph.

A node graph may be generated from the pruned data, as in 612. The pruned data is data other than the data that has been determined to be excluded from the node graph. The node graph that is generated from the pruned data may include first nodes that correspond to collections in the pruned data, second nodes that correspond to representations in the pruned data, and edges that correspond to associations between the collections and the representations.

The generated node graph may be stored in a cache, as in 616. Storing the node graph in cache may allow for recommendations to be formulated in less time than if the node graph is stored in memory. The node graph generating process 600 may provide a node graph that is suitable for use in the recommendation environment 100 of FIG. 1. Upon completion of the node graph being stored in a cache, the process may complete, as in 620. In some implementations, the node graph generating process 600 may be performed on a periodic basis on collection data in order to generate a node graph that may incorporate changes to collection data (e.g., users adding representations to collections) since a previous node graph was generated.

Figure 7:
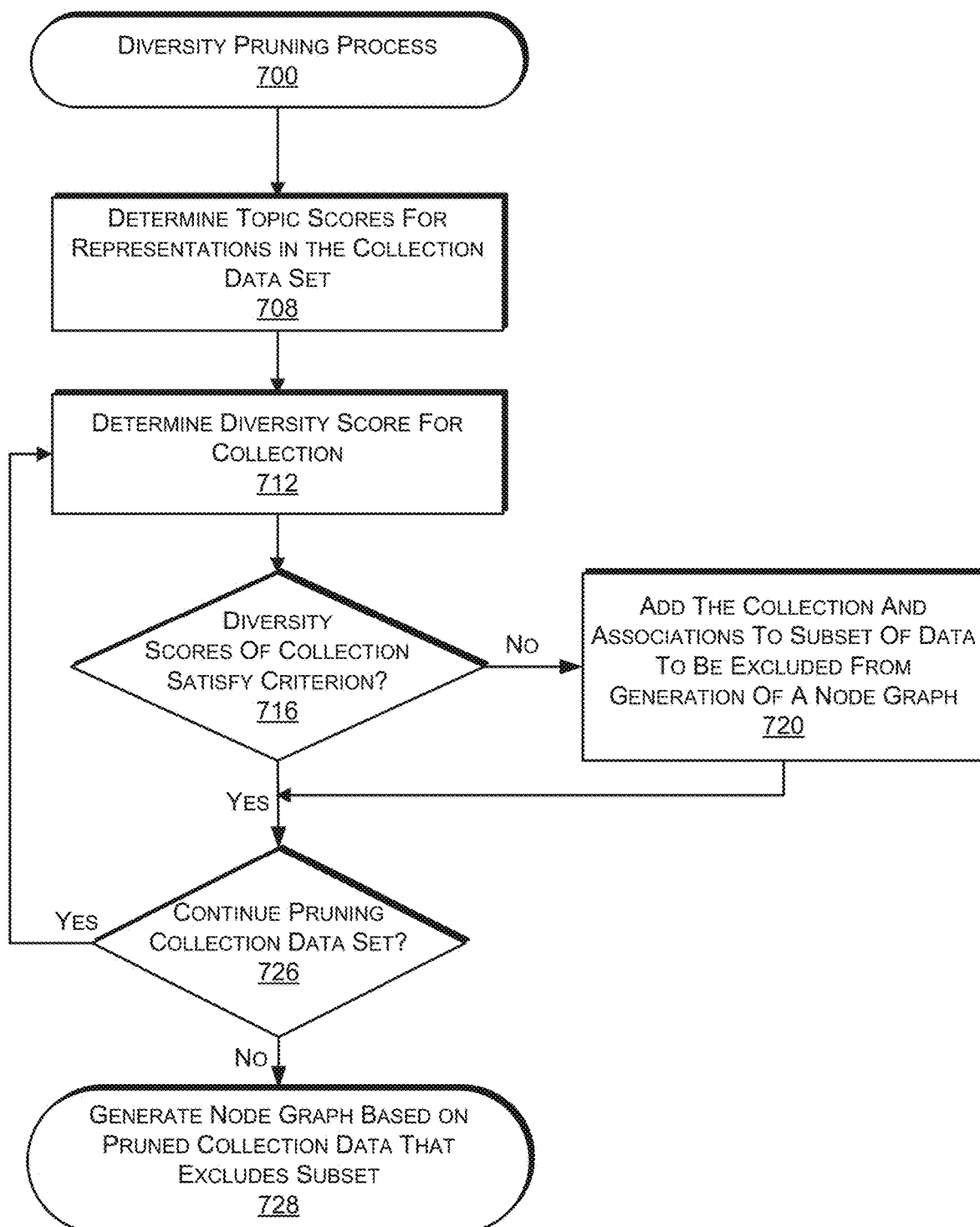
FIG. 7 is a flow diagram illustrating an example process for diversity pruning a node graph, according to an implementation.

Referring now to FIG. 7, which illustrates an example diversity pruning process 700 for pruning a collection data set, according to an implementation. The collection data set may include collection data such as collection data 200 described in connection with FIG. 2. The collection data set may include representations, collections, associations between the representations and collections, and user-provided textual descriptions for the collections and/or representations.

The example process 700 begins by determining topic scores for representations in the collection data set, as in 708. Topic scores for representations in the collection data set may be previously determined and associated with the representations in the collection data set or determined by processing the representation and/or data associated with the representation to determine amounts of one or more topics to which the representation pertains, as discussed above. Such previously determined topic scores for representations may be maintained by a collection management system. Topic scores for representations may be topic vectors that are determined by applying a LDA topic model to the representations and/or data associated with the representations. For example, topic scores may be based at least in part on descriptions or other information associated with the representations. These descriptions may include textual descriptions that may be provided by human users that may be associated with the representation. The topic scores may indicate amounts of one or more particular topical categories for the representation. For example, a representation depicting a strawberry smoothie may be associated with a description "My favorite fruit breakfast." A topic score for this representation with respect to the topics of "breakfast" and "fruit" may both be 50%. Topic scores determined for the representations may be maintained as topic vectors, for example, in the collection data, such as the collection data 112 of the data 101 of FIG. 1 or the collection data 200 of FIG. 2.

At 712 a diversity score is determined for a collection. The diversity score for the collection may indicate an amount of topical diversity, topical entropy, and/or topical variance of the representations associated with the collection. Diversity scores for a collection may be based at least in part on topic scores of representations that are associated with the representation. For example, diversity scores for a collection may be determined by analyzing and/or comparing topic scores of the representations that are included or associated with the collection for topical diversity. In one or more implementations, diversity scores for each collection is determined by applying a diversity model to topic scores of the representations associated with the collection. The diversity score for a collection may be associated with the collection and maintained by a collection management system.

At 716 a determination is made as to whether the determined diversity score satisfies a diversity score criterion. For example, the diversity score criterion may be a threshold value that is indicative of a limit on an acceptable amount of diversity for the collection to be incorporated in a node graph that will be used by a recommendation engine to generate recommendations.

If it is determined that a diversity score for the collection does not meet the diversity score criterion, i.e., the topical diversity of the collection is too high, the collection and its associations to representations may be included in a subset of the collection data, as in 720. The subset of the collection data is not included in the pruned collection data from which a node graph is generated or constructed. In one or more implementations, the diversity score criterion may be adjusted in order to increase or decrease the amount of collections that are incorporated into a node graph that is constructed from the collection data set.

If it is determined at 716 that the diversity score for a collection satisfies or meets the diversity score criterion, a determination is made at 726 as to whether the pruning of the collection data set should continue. For example, it may be determined that the pruning should continue if a diversity score is unknown for a collection in the collection data, one or more known diversity scores for collections in the data set have not yet been checked against the diversity score criterion, or data in the collection data has been modified in a way that may impact diversity score for the collection. For example, if a user modifies a description for a representation included in the collection data set, the topic score for the representation may change and such change may change the diversity score for a collection associated with the representation. In another example, a user adding an association between a collection and a representation may cause a change to a diversity score for the collection.

If it is determined that the pruning process should not continue at decision block 726, a node graph may be generated from pruned collection data that excludes the collection data subset, as in 728. The pruned collection data set may be, for example, a copy of the collection data set with at least the collection data subset removed. A recommendation engine may use the node graph generated from the pruned collection data to determine recommendations.

Returning to decision block 726, if it is determined that the pruning process should continue, the example process 700 returns to block 712 where a diversity score for a different collection may be determined. A diversity score for a different collection of the data set may be determined each time the example process 700 transitions from block 726 to block 712.

Figure 8:
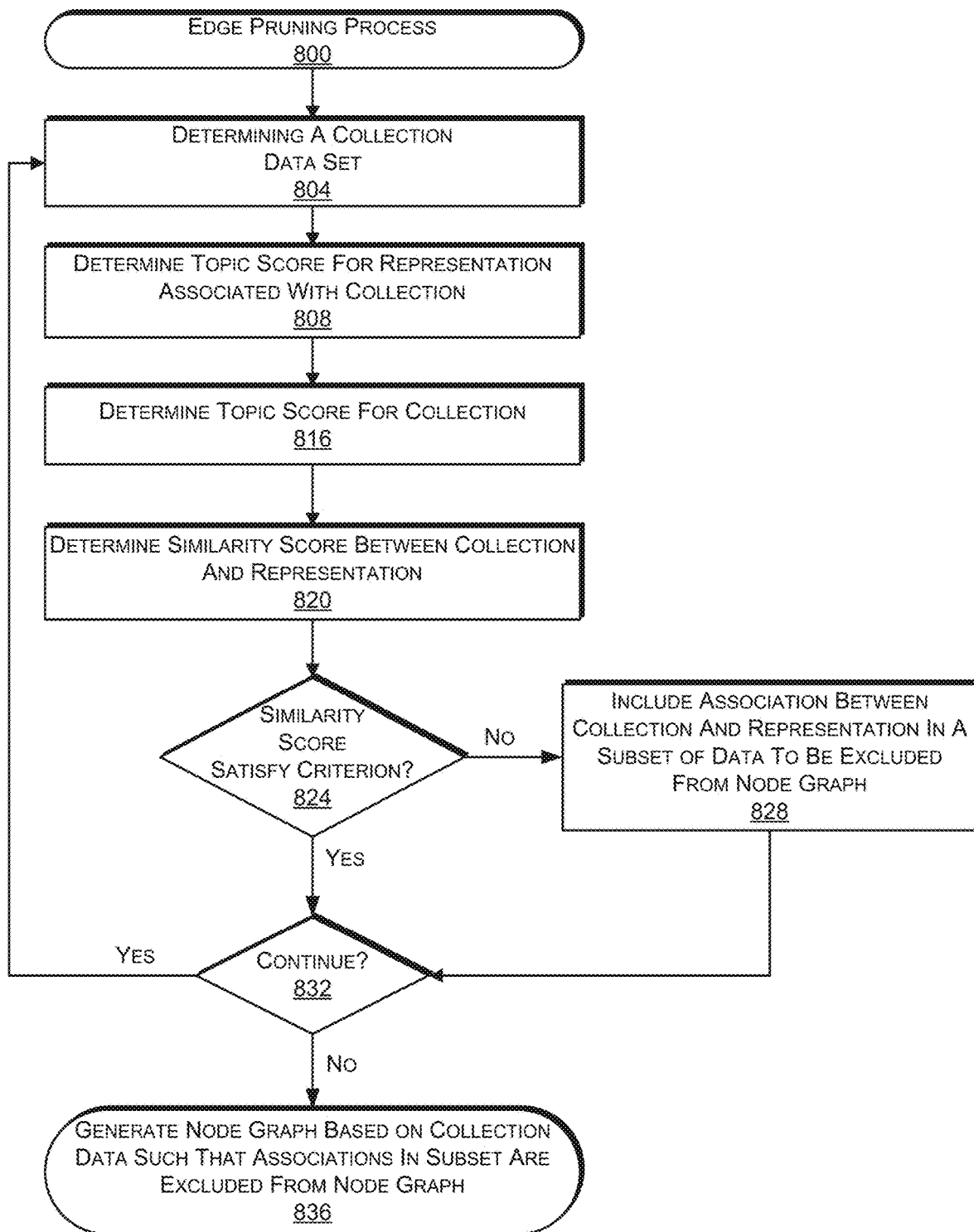
FIG. 8 is a flow diagram illustrating an example process for edge pruning a node graph, according to an implementation.

Referring now to FIG. 8, which illustrates an example edge pruning process 800 for pruning a collection data set, according to an implementation. The process 800 begins by determining a collection data set at 804. For example, the collection data set may include representations, collections, associations between the representations and collections, and other data associated with the representations and/or collection, such as user-provided textual descriptions for the collections and/or representations.

A topic score for a representation associated with the collection may be determined, as in 808. A topic score for the representation may be determined, for example, by running an LDA topic model on data (e.g. a textual description) associated with the representation. In some implementations, a previously determined topic score for some or all of the representations may be maintained in the collection data set by the collection management system. In such implementations, the topic score is retrieved from the collection data set and may not need to be recalculated. The topic score for the representation may be updated when the representation has recently been associated with the collection or a description associated with the representation has been modified, for example, by a user. For example, a user may change a description for a representation of the Grand Canyon from "I want to visit!" to "Visited on ABC Company retreat in 2017," after the user has visited the Grand Canyon. Such changes to the description for a representation may cause the topic score for the representation to change.

At block 816, a topic score for a collection may be determined. A topic score for the collection may be determined, for example, by taking an average of the topic scores of representations that are associated with the collection. In some implementations, the topic score for the collection may be maintained in the collection data set by a collection management system. In such implementations, the previously determined topic score for the collection may be retrieved if the topic score for the collection has not changed.

A similarity score may be determined between the collection and a representation associated with the collection, as in 820. The similarity score may be determined, for example, at least in part on the topic score for the collection and the topic score for the representation. In one or more implementations, the topic score for the collection and the topic scores for the representations associated with the collection may be represented as topic vectors, and the similarity score is determined at least in part by determining the cosine similarity of the topic vector for the collection and the topic vector for the representation. In some implementations, the similarity score is an absolute value of the determined cosine similarity ($|E|$) with a pruning factor ($\delta$) applied exponentially. In such implementations, the similarity score is $|E|^\delta$. The pruning factor $\delta$ may be adjusted up or down depending on the amount of pruning that is desired and/or the desired size of the constructed node graph. Other methods of determining a value that represents a topical similarity between the collection and the representation may be utilized.

At block 824 a determination is made as to whether the similarity score satisfies a similarity score criterion. The similarity score criterion may be a value that is indicative of a limit on an acceptable amount of topical dissimilarity between the collection and the representation for the association between the collection and the representation to be included in a node graph. In some implementations, the similarity score criterion may be adjusted up or down depending on the desired size of the node graph that is ultimately constructed from the collection data.

If it is determined at block 824 that the similarity score does not meet the similarity score criterion, the association between the collection and the representation corresponding to the determined similarity score may be included in a subset of data that is to be excluded from the generation of a node graph, as in 828.

Associations between collections and representations may also be included in the subset of data that is to be excluded from the generation of the node graph based on other factors, such as age of the association. For example, all representations that were added to the collection data prior to a date or time may be determined and all associations to these determined representations may be added to the subset that is to be excluded from the generation of the node graph. In some implementations, associations between collections and representations that were created or last modified at least an amount of time in the past are determined and all the associations are added to a subset to be excluded from the node graph that is constructed. In some implementations, representations that are not associated with any collection are identified and added to the subset of data that is to be excluded from the node graph.

If it is determined at 824 that the similarity score between a collection and a representation satisfies a similarity score criterion, a decision is made whether to continue with the edge pruning process, as in 832. If it is determined at 832 that the process should continue, the process returns to 804 where the next collection in the data set is determined and processed. For example, the process 800 may continue if it is determined that a topic score is unknown or needs to be updated for one or more collections and/or representations in the collection data set. In some implementations, the process 800 identifies all collections and/or representations in the collection data set with unknown topic scores or topic scores that need to be updated. A topic score for a representation or collection may be determined to need updating if it has been recently updated and a stored topic score for the representation or collection does not reflect the updates. In some implementations, similarity scores between collections and representations may be maintained by a collection management system. In these implementations, the similarity scores do not need to be recalculated if no significant change has occurred to the collection and the associated representation since the similarity score was determined. In these implementations, the similarity score may be retrieved.

If it is determined at block 832 that the process 800 should not continue, the process 800 may generate a node graph that does not include the associations and other data from the collection data that are included in the subset, as in 836. In some implementation, the process 800 should not continue if it determined that all needed similarity scores have been determined. A pruned collection data set may be generated from the collection data set with the subset of data having been removed or excluded. The node graph may be generated from the pruned collection data set that does not include the associations in the subset of associations that are to be excluded from the node graph.

Figure 9:
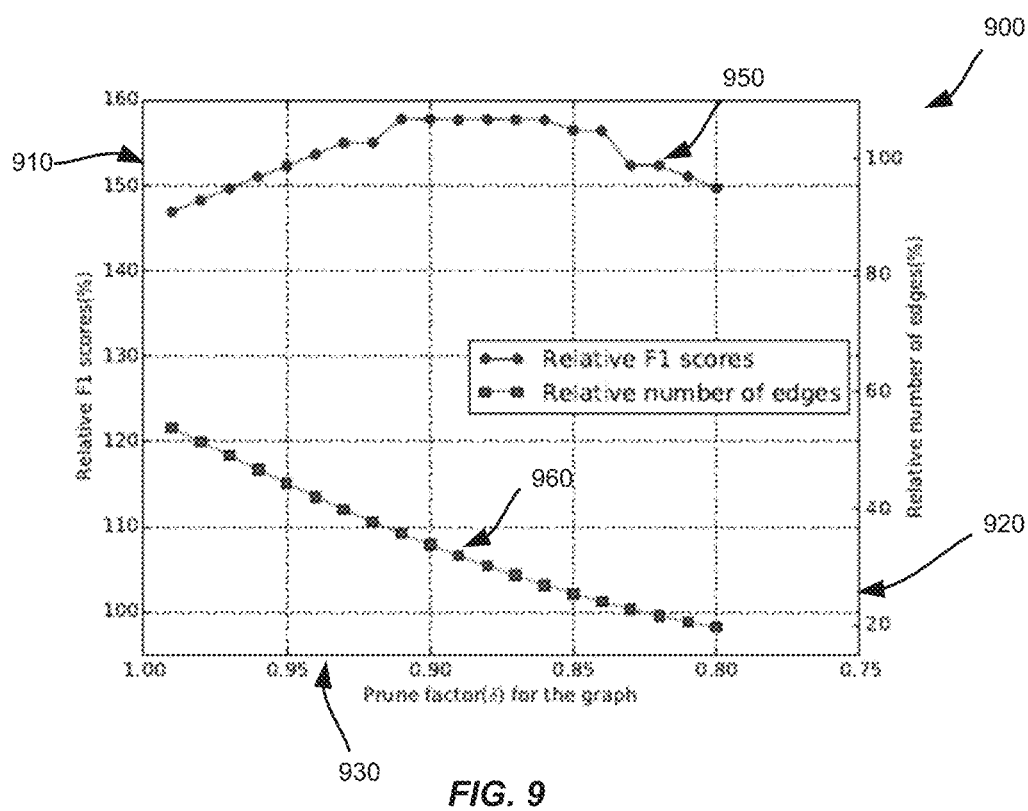
FIG. 9 is a graph illustrating relationships between pruning factor, the amount of edges that are represented in a node graph, and the quality of recommendations obtained using the node graph, according to an implementation.

FIG. 9 is a graph 900 that illustrates a relationship between a quality of recommendation results (F1) that may be provided by a recommendation system using a node graph generated from different pruning criteria, as indicated by pruning factor S. As discussed above, decreasing the pruning factor δ may result in more pruning of a data set and correspondingly fewer edges being included in the node graph. A first axis 910 indicates an F1 score that is a measure of the quality of recommendations results provided by a recommendation service. A second axis 920 indicates a relative number of edges (%) of a node graph, and a third axis 930 indicates a pruning factor S. A first plot 950 indicates a relative F1 score, and a second plot 960 indicates relative number of edges (%). As shown by the plots 950 and 960, pruning may improve the quality of recommendations because the F1 score increases with increased pruning. Pruning data that is used to construct a node graph may improve the quality of the recommendations that may be provided by random walks through the node graph because pruning may identify associations between topically dissimilar collections and representations and prevent such associations from being incorporated into the node graph that is constructed from the data. In other words, pruning enables a node graph to be constructed with greater topical similarity between nodes corresponding to collections and nodes corresponding to representations because associations between dissimilar collections and representations in data are excluded from the node graph that is constructed from the data.

Figure 10:
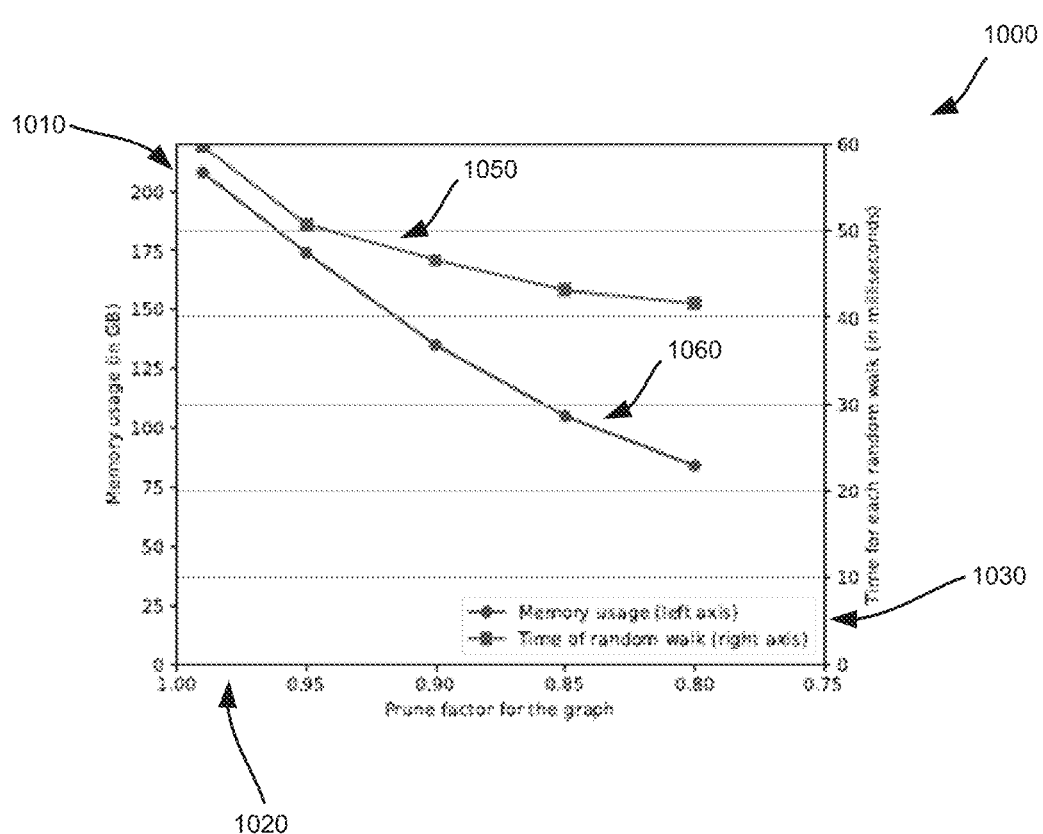
FIG. 10 is a graph illustrating relationships between memory usage, pruning factor, and latency for performing random walks of a node graph, according to an implementation.

FIG. 10 is a graph 1000 that illustrates a relationship between memory usage and random walk times for different pruning criteria, as indicated by a pruning factor S. A first axis 1010 indicates memory usage, a second axis 1020 indicates a pruning factor δ for the graph, and a third axis 1030 indicates a time for each random walk (in milliseconds). A first plot 1050 indicates memory usage, and a second plot 1060 indicates a time for each random walk. As shown in the graph 1000, increasing the pruning factor δ used to determine similarity scores, for example at block 824 in process 800 of FIG. 8, so that an increased amount of connections between topically dissimilar collections and representations are excluded from being incorporated into a node graph that is constructed from the data results in decreased memory usage and reduced random walk times. By decreasing both memory usage and random walk times, the performance of the recommendation system is improved and the computation cost to generate recommendations is decreased.

Figure 11:
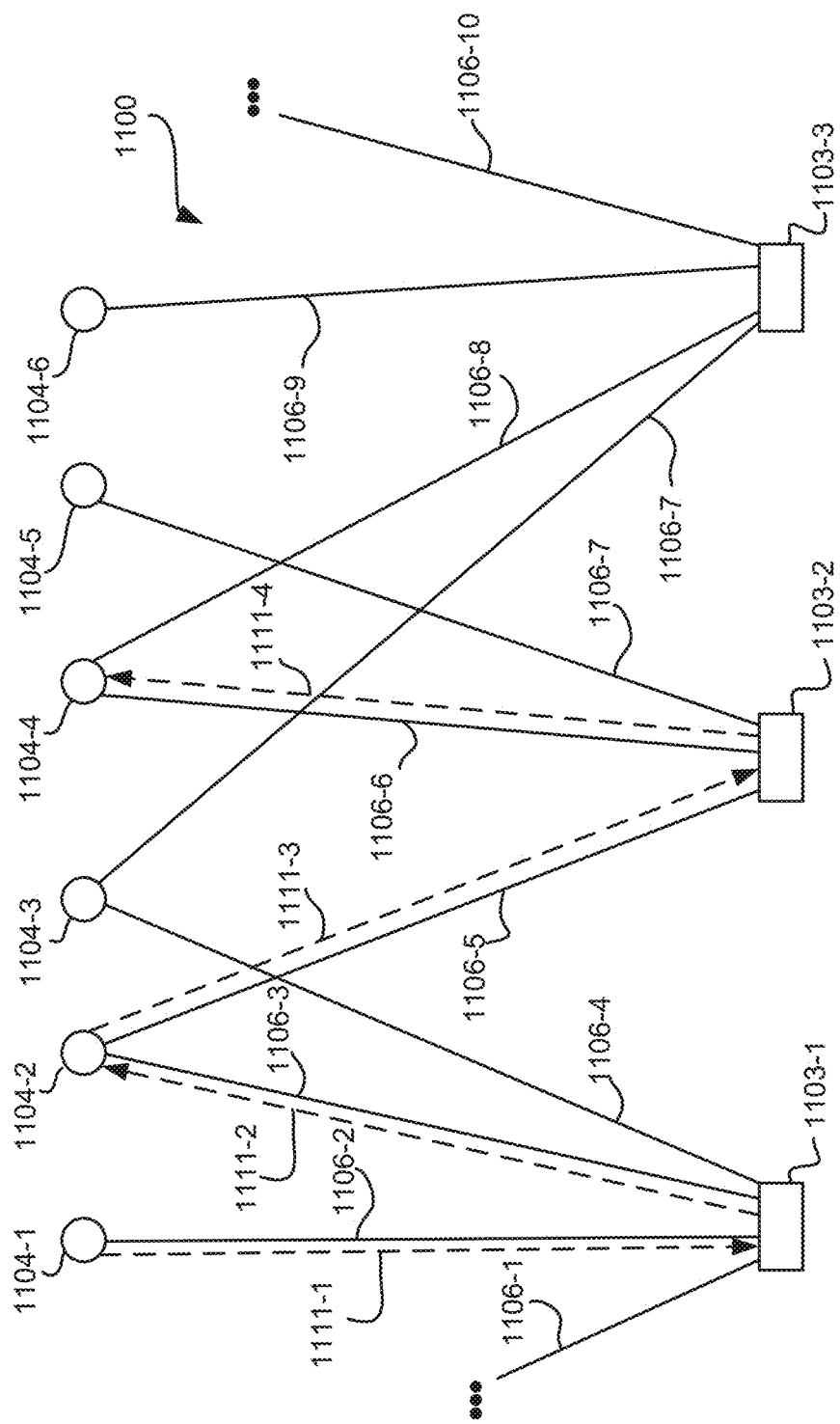
FIG. 11 is a block diagram illustrating an example early stopping of a random walk through a portion of a node graph, according to an implementation.

FIG. 11 illustrates an example of a random walk through a portion of a node graph 1100. A random walk, as discussed herein, refers to a traversal of the node graph through nodes corresponding to collections and representations. A step, as discussed herein, refers to traversing from a node to another node that are connected by an edge. For example, a random walk having five steps will traverse along five edges to up to five nodes not including the node from which the walk was initiated. For purposes of explanation, a walk through a node graph that is performed with the described implementations, will be described as being performed by a walker that walks through the node graph along edges between nodes. In the example, first nodes 1103-1 through 1103-3 correspond to collections. Second nodes 1104-1 through 1104-6 correspond to representations. Edges 1106-1 through 1106-10 correspond to associations between collections and representations. Paths 1111-1 through 1111-4 represent a path of a walk through the node graph.

In some implementations, random walks may have a defined amount of steps or step length. The defined amount of steps may be a constant, or the defined amount of steps may vary depending on each individual random walk and/or for the query node from which the walks originate. In some implementations, the step length of each walk may be selected by a randomizing function. In other implementations, the walk length is not pre-determined. For example, the walk length may be determined during the random walk. For example, at each step a randomizing function may be used to determine whether the walk should terminate or continue. Once a walk terminates it, it may restart. A walk may restart by a new walk being initiated from the same or a different query node from which the terminated walk was initiated. In some implementations, a walk length for an individual walk may be determined prior to each restart.

According to one approach, a walk is performed on the node graph 1100 where the walker starts walking on a node corresponding to a representation or a collection. The walker walks from a current node to the next node by walking on an edge from a node representing a collection to a node representing a representation. When there are two or more such edges connected to the current node, the walker picks one of these edges for the next step. The walk may be "random" such that the probabilities that the walker will pick a particular edge of a plurality of edges connected to the current node may be substantially equal. In one or more implementations, such as implementations discussed in connection with FIGS. 14 and 16, the probabilities that the walker will pick a particular edge connected to the current node may be weighted or biased such that one edge connected to the current node has a higher probability than another edge connected to the current node. In some implementations, the walker cannot traverse to certain edges, or the probability of a walker traversing to an edge is zero. In one or more implementations, the walker cannot walk to a node that the walker has already visited on the particular walk. In some implementations, the walker cannot traverse to query nodes because query nodes would not be recommended to a user. As the walker steps between nodes in the graph, the visit counts for each node may be tracked in a visit count set, where each visit count in the visit count set corresponds to one of the nodes.

In the example shown in FIG. 11, the walker is on second node 1104-1 that corresponds to a representation and walks on a path 1111-1 along edge 1106-2 to first node 1103-1 that corresponds to a collection. At first node 1103-1, there are four edges 1106-1, 1106-2, 1106-3, and 1106-4. Edges 1106-2, 1106-3, and 1106-4 connect to second nodes 1104-1, 1104-2, and 1104-3 that correspond to representations, respectively. An edge is chosen and the walker walks along the chosen edge in the next step. In this example, the walker follows path 1111-2 along edge 1106-3 to second node 1104-2 that represents a representation. At second node 1104-2 there are edges 1106-5 and 1106-3. An edge is chosen and the walker walks along the chosen edge in the next step. From second node 1104-2 that corresponds to a representation the walker follows path 1111-3 along edge 1106-5 to first node 1103-2 that represents a collection. At first node 1103-2 that represents a collection there are three edges 1106-5, 1106-6, and 1106-7. An edge is chosen and the walker walks along the chosen edge in the next step. At first node 1103-2 the walker follows path 1111-4 along edge 1106-6 to second node 1104-4 that corresponds to a representation. At second node 1104-4 there are edges 1106-6 and 1106-8. In the present example, the visit counts of second node 1104-1, first node 1103-1, second node 1104-2, first node 1103-2, and second node 1104-4 are each incremented because the walker visits those nodes during the walk. As discussed, multiple random walks may be executed on the node graph and with each random walk, the visit count may be incremented for each node of the node graph each time a walk visits that node.

At second node 1104-4 the walk terminates. Individual walks may terminate in various different ways. In one or more implementations, a walk may terminate when a defined amount of steps through the node graph has occurred. In some implementations, an individual walk may terminate when it traverses to a node that is not connected to another node. In other implementations, an individual walk may terminate after a defined amount of steps has occurred through the node graph after the walk is initiated. In some implementations, an amount of steps for each walk is not constant or defined, i.e., it is randomly selected, for example, using a randomizing function. In some implementations, it may be randomly determined whether to terminate or continue the walk. Once a walk terminates, a new walk may restart from the node from which the previously terminated walk was initiated or another node, e.g., a query node.

The running of the plurality of random walks may terminate because certain visit count conditions of one or more nodes of the node graph have been met. In some implementations, the random walks through the node graph may terminate when a defined number of nodes have visit counts or proximity scores that are above a defined amount. For example, the plurality of random walks may terminate when 5% of the nodes have visit counts that are above 10. In some implementations, the visit counts may be used to determine proximity scores, which is indicative of a relevance of corresponding nodes with respect to a query.

Figure 12:
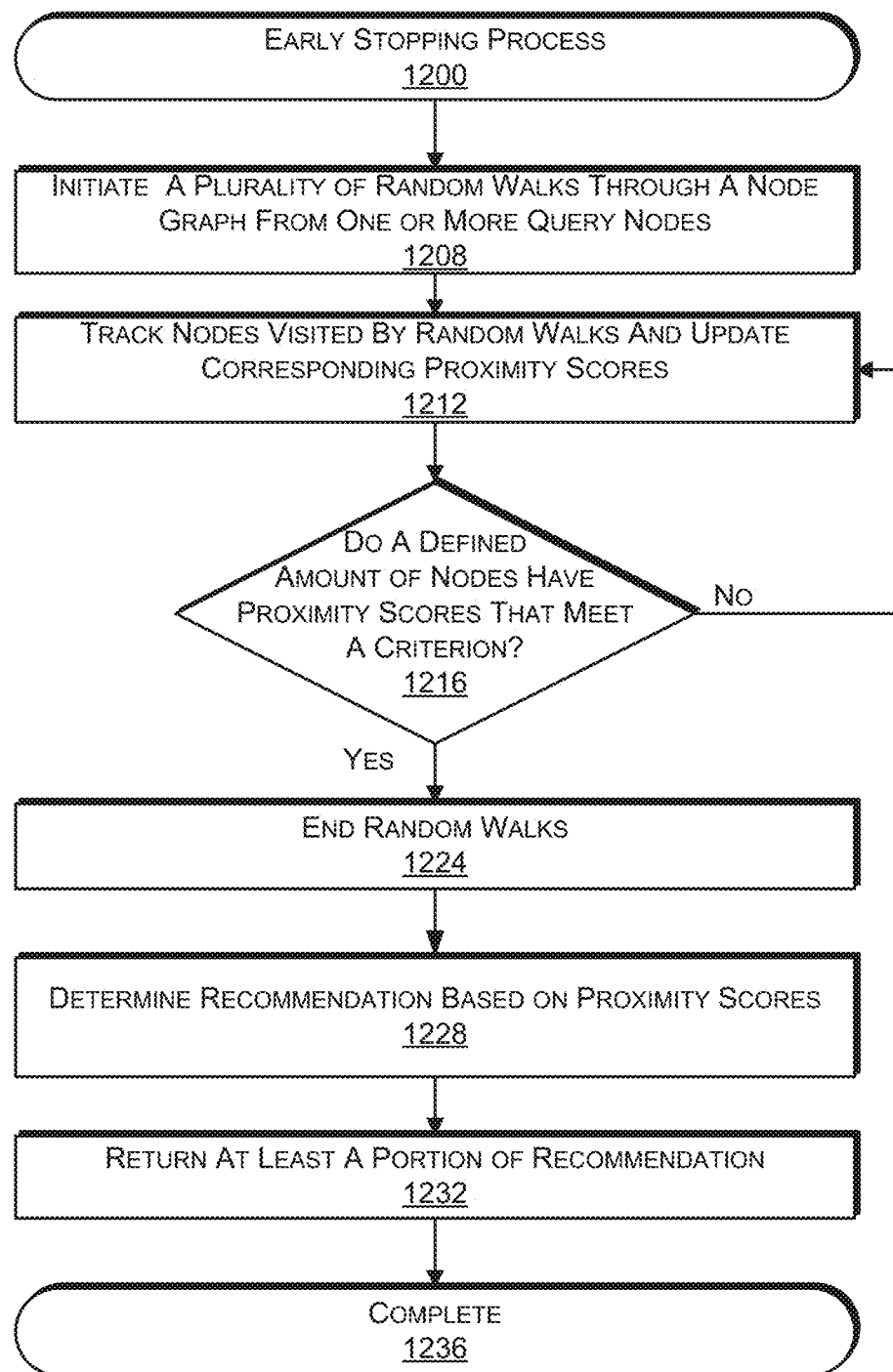
FIG. 12 is a flow diagram illustrating an example random walk process utilizing early stopping in connection with a random walk of a node graph, according to an implementation.

FIG. 12 illustrates an example early stopping process 1200 for ending random walks through a node graph, such as the portion of the node graph 1100 of FIG. 11, according to an implementation. The node graph may include a first set of nodes that correspond to (or represent) collections, a second set of nodes that correspond to (or represent) representations (e.g., media objects), and a set of edges that correspond to (or represent) associations between nodes in the first set of nodes and nodes in the second set of nodes.

A plurality of random walks may be initiated in the node graph, as in 1208. The random walks may be initiated from nodes of a query. The query may be determined, for example, based on a representation or collection being selected by a user or a user viewing the representation or collection. The query may include one or more representations or collections, or one or more nodes in the node graph that correspond to one or more representations or collections. If the query set is made up of one or more nodes, the plurality of random walks may be initiated from the one or more nodes. If the query set is made up of one or more representations and/or collections, the collection management system may identify one or more nodes in the node graph that correspond to the one or more representations in the query set and the random walks may be initiated from the one or more nodes in the query set. Once initiated, the plurality of random walks step through the node graph and visit nodes.

The nodes visited by the plurality of random walks may be tracked and a proximity score set for the nodes may be updated, as in block 1212. Each visit to a node by a walk may cause the visit count for the node to be incremented. Once the plurality of walks have terminated, the visit counts indicate the total visits for each node that resulted from the plurality of random walks.

A proximity score for a node may indicate a relevance of the node with respect to the query set. Proximity scores for nodes may be determined, for example, based at least in part on the visit counts for corresponding nodes. In some implementations, the proximity scores are equivalent to visit counts. In other implementations, proximity scores for some or all nodes in the node graph are different from visit counts for other nodes. For example, a node that has been visited by multiple random walks that have originated from different query nodes may have a visit count that is indicative of the total number of visits. In this example, the proximity score for the node that has been visited by random walks originating from multiple different query nodes may be increased to an amount that is greater than the actual visits to that node. Similar implementations are discussed in connection with FIGS. 19 and 20. In some implementations, such as implementations discussed in connection with FIGS. 21 and 22, a proximity score for a node is increased if nodes in a designated "cluster" of nodes is visited by a random walk.

If it is determined at 1216 that at least a defined amount of nodes have corresponding proximity scores that meet a stopping criterion, the running of the random walks through the node graph may end, as in 1224. The stopping criterion may be, for example, a visit count threshold or a proximity score threshold. This ending of the random walks may occur prior to another ending condition, such as completion of a defined amount of walks or an amount of steps, being satisfied. The defined amount of nodes and the stopping criterion may both be constants, or one or both may depend on, for example, one or more of an amount of nodes in the node graph that correspond to representations, an amount of nodes that correspond to collections in the node graph, or an amount of edges in the node graph. In implementations where a representation is to be recommended, the defined amount of nodes may be for a particular type of node. For example, the recommendation system may monitor the proximity score set to determine when at least 5% of nodes that correspond to representations have proximity scores above a particular score, e.g., 25. The recommendation engine may monitor sets of the visit counts and/or sets of proximity scores for the nodes in the node graph, and if it is determined at 1216 that a defined amount of nodes do not have corresponding proximity scores that meet a criterion, the process returns to 1212 and continues.

After ending the random walks, a recommendation may be determined based on the proximity scores or visit counts, as in 1228. For example, the recommendation may include nodes corresponding to representations with the highest corresponding proximity scores or visit counts. At least a portion of the recommendation may be returned at 1232 and provided to a client device for presentation. A plurality of representations that correspond to nodes that are included in the recommendation may be provided to a client device. Some or all of these representations may be presented on the user device. Once at least a portion of the recommendation has been returned, the process 1200 terminates at 1236.

Figure 13:
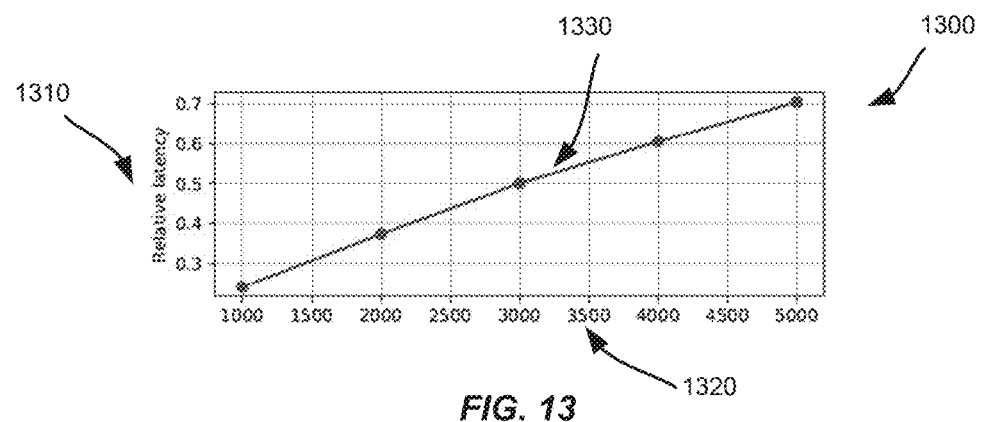
FIG. 13 is a graph illustrating example relationships between early stopping of a random walk, latency, and a visit count threshold for a number of representations to be above a visit count threshold, according to an implementation.

Referring now to FIG. 13, which is a graph 1300 that illustrates a relationship between latency and a minimum number of nodes that are required to reach a stopping criterion of having a visit count that equals four (nv=4) for an early stopping process, such as process 1200 of FIG. 12. A first axis 1310 indicates a relative latency with respect to a full walk that terminates once a defined amount of walks or steps have been performed, and a second axis 1320 indicates a minimum number of nodes that are required to reach the stopping criterion. As indicated by plot 1330, early stopping may reduce the latency in determining a recommendation. Reducing the latency required to perform the plurality of random walks may enable recommendations to be provided more quickly and with fewer computing resources.

Figure 14:
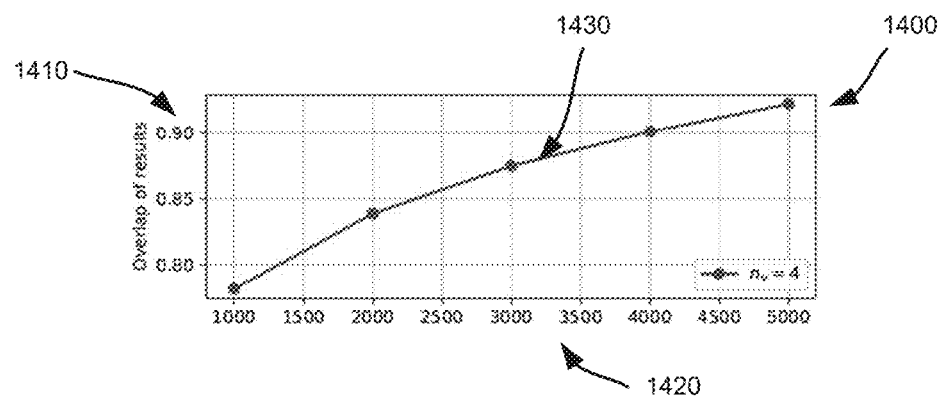
FIG. 14 is a graph illustrating example relationships between early stopping of a random walk, overlap of results, and number of representations above a visit count threshold, according to an implementation.

Referring now to FIG. 14, which is a graph 1400 that illustrates a relationship between overlap of results and minimum number of nodes reaching a stopping criterion of a visit count that equals four (nv=4) for an early stopping process, such as process 1200 of FIG. 12. A first axis 1410 indicates an overlap of results with respect to a full walk, and a second axis 1420 indicates a minimum number of nodes that are required to reach the stopping criterion. As indicated by plot 1430, an early stopping process may provide recommendations with a relatively high amount of overlap with respect to recommendations provided by a full walk.

The high amount of overlap indicated by the graph 1400 suggests that recommendations provided by a random walk process that uses an early stopping process that terminates after a defined amount of walks or steps have been reached may be comparable in quality to the recommendations that are provided by a full walk. Therefore, a random walk process that uses an early stopping process may provide recommendations that are comparable in quality to the recommendations that are provided by a full walk but with reduced computing resources because the random walk process is stopped early.

Figure 15:
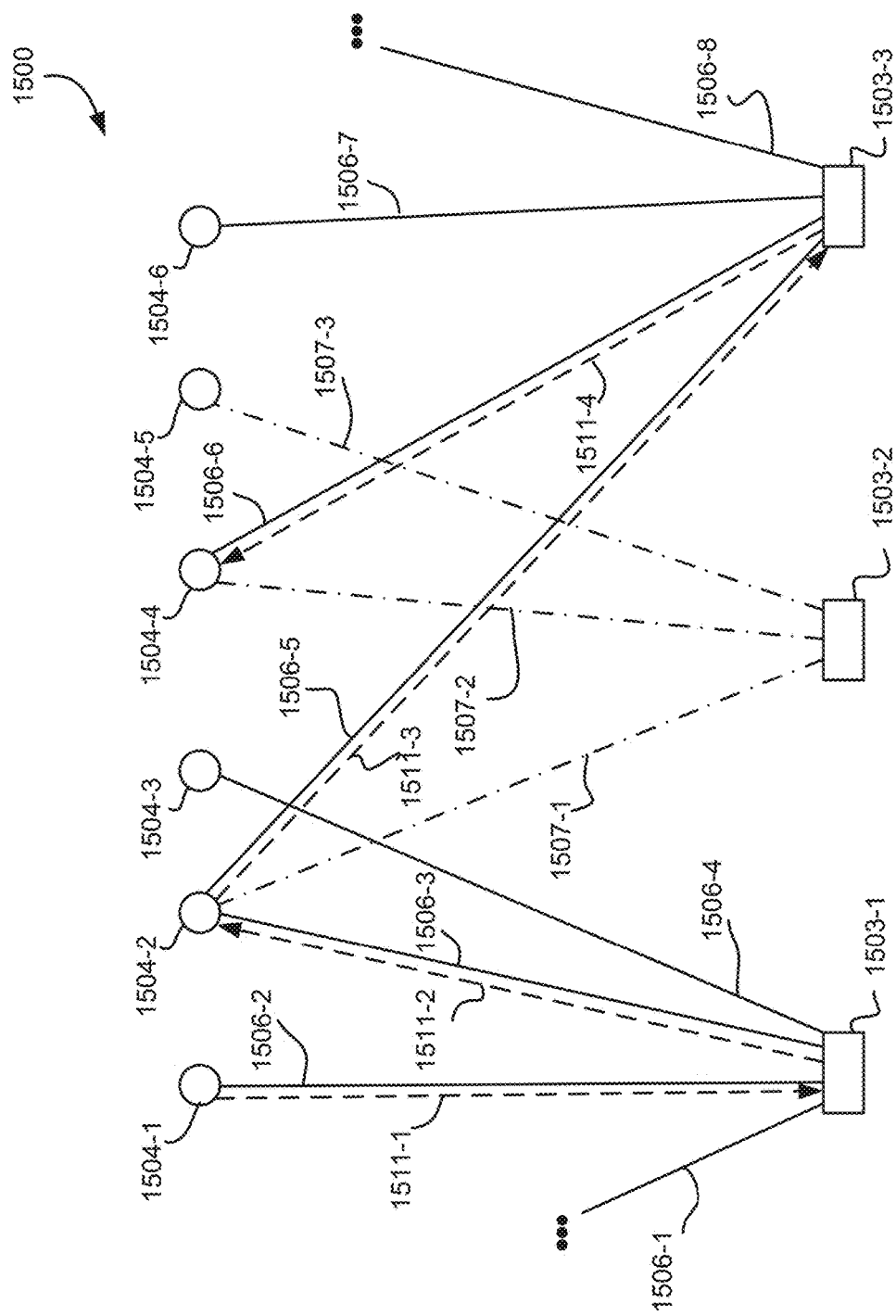
FIG. 15 is a block diagram illustrating an example random walk of a portion of a node graph with biasing based on geography, according to an implementation.

Referring now to FIG. 15, which illustrates an example of a biased walk through a portion of a node graph 1500. First nodes 1503-1, 1503-2, and 1503-3 may represent collections and second nodes 1504-1 through 1504-6 may represent representations. In one or more implementations, different types of edges may be used to signify different edge properties or characteristics. First edges 1506-1 through 1506-8 represent connections between collections and representations having a first characteristic. Second edges 1507-1, 1507-2, and 1507-3 represent connections between collections and representations having a second characteristic. A characteristic of an edge may be determined, for example, by analyzing a description associated with a collection and/or a representation that corresponds to a node that is connected to the edge. The first characteristic may be a first language, e.g., Spanish, English, or French, of a node connected to the edge. The second characteristic may be a different language, for example. In this example, the walker only traverses edges with a particular characteristic. Various different types of characteristics may be utilized and indicated by the edges and/or data associated with the edges. In one or more implementations, edges may indicate or be associated with data that indicates one or more characteristics of a human user associated with a collection and/or a representation that is connected to each edge. For example, edges may indicate a gender, an age, a marital status, or an education level of a human user that is associated with a collection and/or a representation that is connected to the edge. In some implementations, the edge may indicate or be associated with data that indicates a domain or electronic address of a source of a representation that is connected to the edge. For example, an edge may indicate or be associated with data that indicates that a source of a representation connected to the edge is an electronic commerce web-site, in general, or a particular web-site.

Paths 1511-1 through 1511-4 represent a traversal route taken by the walker through the portion of the node graph 1500. In this example, a walker starts on second node 1504-1 and walks to first node 1503-1 along path 1511-1 corresponding to edge 1506-2. At first node 1503-1 there are four edges, i.e., first edges 1506-1, 1506-2, 1506-3, and 1506-4. An edge is chosen and the walker walks along the chosen edge in the next step. In this example, the walker follows path 1511-2 along first edge 1506-3 to second node 1504-2. At second node 1504-2 there are three edges, i.e., first edges 1506-3 and 1506-5, and one second edge 1507-1. In this example, the walker may only step along a first edge because it is desirable to generate recommendations that have the first characteristic. The walker may not step along a second edge 1507-1 because the second edge does not have the first characteristic. Thus, in this example the walker may not step to second edge 1507-1. In some implementations, a first edge is preferred over a second edge. In such implementations, the walker may traverse along a second edge if no first edge is available to traverse. At second node 1504-2, an edge is chosen and the walker walks along the chosen edge in the next step. In this example, the walker follows path 1511-3 along edge 1506-5 to first node 1503-3. At first node 1503-3 there are four potential edges for the walker to select, i.e., first edges 1506-5, 1506-6, 1506-7, and 1506-8. An edge is chosen and the walker walks along the chosen edge in the next step. In this example, the walker follows path 1511-4 along edge 1506-6 to second node 1504-4, which is connected to first edge 1506-6 and second edge 1507-2. In this example, the walker cannot traverse to a node that has already been traversed to by the current walk or step to a second edge. It may be desirable to restrict a walker from traversing to a node that has already been traversed to by the current walk because it could result in nodes that are not connected to many other nodes having increased visit counts from a random walk repeatedly traversing back and forth between several nodes. Likewise, as discussed above, in this example the walker cannot traverse along a second edge 1507-2. As a result, there is no edge to which the walker may traverse and the walk terminates at node 1504-4.

Figure 16:
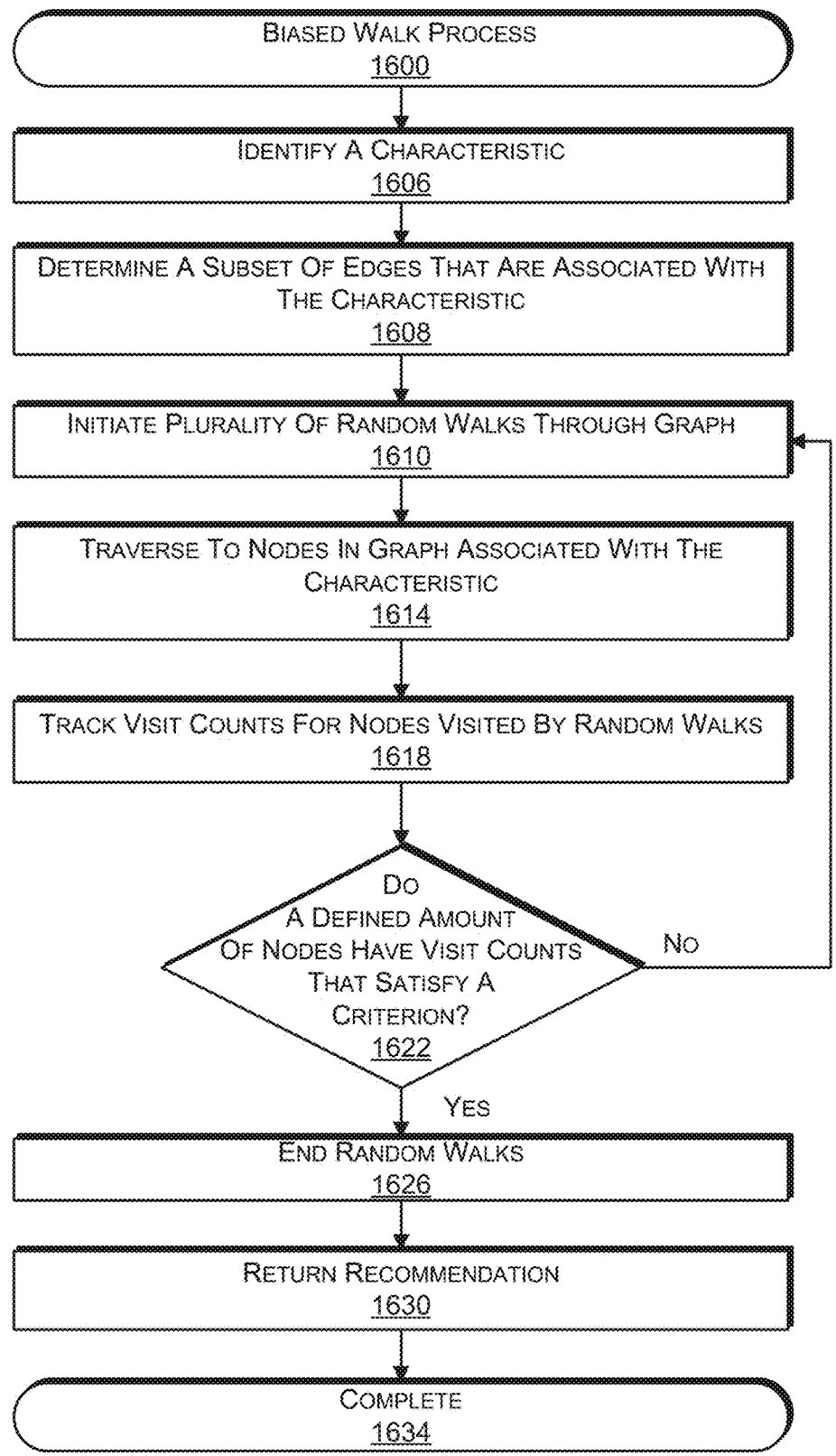
FIG. 16 is a flow diagram illustrating an example process involving a random walk of a node graph with biasing based on geography, according to an implementation.

Referring now to FIG. 16, which illustrates an example biased walk process 1600 for performing random walks through a node graph, such as the portion of the node graph 1500 of FIG. 15. A biased walk process may give preference to traversing along certain edges in the node graph and/or restrict the walker from traversing along particular edges.

For example, a node graph may include nodes with a large variety of languages, and it is desirable to recommend content that is not only relevant but is also in the user's preferred local language, such as English. In such an example, the walk through the node graph will be biased toward nodes or edges that relate to the preferred local language (e.g., English).

The example process 1600 begins by a characteristic being identified, as in 1606. In some implementations, the characteristic may be a country, a geographic location, or a language, etc. In one or more implementations, the characteristic may be an age or age range, a gender, an education level, an income level, a marital status, and/or an age of a user for which a recommendation is to be provided. The characteristic may be determined based on user inputs, or preferences, or data associated with a user. For example, if it is determined that a user is using a Japanese language browser or is associated with an Internet Protocol (IP) address for Japan, the characteristic may be determined to be Japanese language and/or Japanese geographic location. In some implementations, the characteristic is identified to be supplemental information (e.g., advertisements) because it is desired to provide advertisements as recommendations. In some implementations, the characteristic may be context, certain topic scores, or certain constraints. For example, the identified characteristic may be representations without restrictions on modification. In some implementations, the characteristic may be an age of a representation, an amount of associations for the representation, and/or a date that a representation was associated with a collection. In one or more implementations, two or more different characteristics are identified. In one example, Japanese language and merchant web-sites may be identified as characteristics in 1606. In another example, the Japan geographic region and males age 25 and 38 may be identified as characteristics. Various characteristics from the collection data may be identified, such as those included in the collection data 200 of FIG. 2.

A subset of edges in the node graph may be identified that are associated with the identified characteristic(s), as in 1608. In one or more implementations, a collection data set corresponding to the node graph may be analyzed to identify collections and/or representations that have the identified characteristic. For example, the identified characteristic may be Japan. Each representation in a set of collection data may be associated with a geographic region. Second nodes corresponding to representations with the identified characteristic (Japan) may be identified and edges connected to the representations having the identified characteristic may be included in a subset of edges. In one or more implementations, each collection in a set of collection data may be associated with a geographic region, first nodes corresponding to collections having the identified characteristic (Japan) may be identified and edges connected to the collections having the identified characteristic may be included in the subset of edges. In some implementations, only edges that connect first nodes that correspond to collections that have the identified characteristic and second nodes that correspond to representations that have the identified characteristic are included in the subset of edges.

In some implementations, content of representations in the collection data set or data associated with representations in the collection data set may be processed to identify representations that have the identified characteristic. For example, descriptions associated with representations may be analyzed to determine a language of the description to determine a geographic region for a representation or collection. In another example, a geographic region for a representation may be determined by analyzing a language or an IP address of a website associated with the representation. If it is determined that one or both of a collection and an associated representation have the characteristic, then the edge that connects the collection and the representation is included in the subset of edges. The edges in the subset may be modified to indicate that they have or do not have the characteristic.

A plurality of random walks may be initiated from query nodes, as in 1610. Each walk traverses to nodes that are associated with the characteristic, as in 1614. The random walks may only traverse along edges that are included in the subset of edges. In such implementations, if an edge in the node graph is not included in the subset of edges, then the plurality of random walks cannot traverse along that edge. For example, if the identified characteristic is a first geographic location, the random walk traverses or walks only to nodes that are associated with the first geographic location by only traversing edges that are included in the subset. In some implementations, random walks favor traversing along edges in the subset of edges. For example, a random walk may be two times as likely to traverse along an edge in the subset of edges as an edge that is not included in the subset set of edges. In some implementations, a random walk will terminate and/or restart if there is no node associated with the characteristic available to which to traverse. Visit counts for nodes visited by random walks may be tracked, as in 1618. In some implementations, a proximity score may be determined based on the tracked visit counts for the nodes.

In one or more implementations, the early stopping process discussed in connection with FIGS. 12 and 13 may be used to terminate the plurality of random walks through the node graph. For example, if at block 1622, it is determined that a defined amount of the visit counts satisfy a criterion, the random walks end, as in 1626. For example, the defined amount may be based on a percentage of the nodes, collections, representations, etc. The defined amount may be modified because the walks are restricted to fewer nodes. If at block 1622 it is determined that the defined amount of visit counts do not satisfy the criterion, the process 1600 returns to block 1610, and continues.

The random walks may end in other ways. In some implementations, the plurality of random walks may terminate once an amount of random walks through the node graph have been performed or an amount of steps have been performed by random walks through the node graph. After terminating the random walks, a recommendation may be returned, as in 1630. The recommendation may be returned by being sent to a client device. The recommendation may be determined based on visit counts or proximity scores. For example, the recommendation may include representations or collections corresponding to the nodes in the node graph with the highest proximity scores or highest visit counts. Once the recommendation is returned, the process 1600 may complete, as in 1634.

Figure 17:
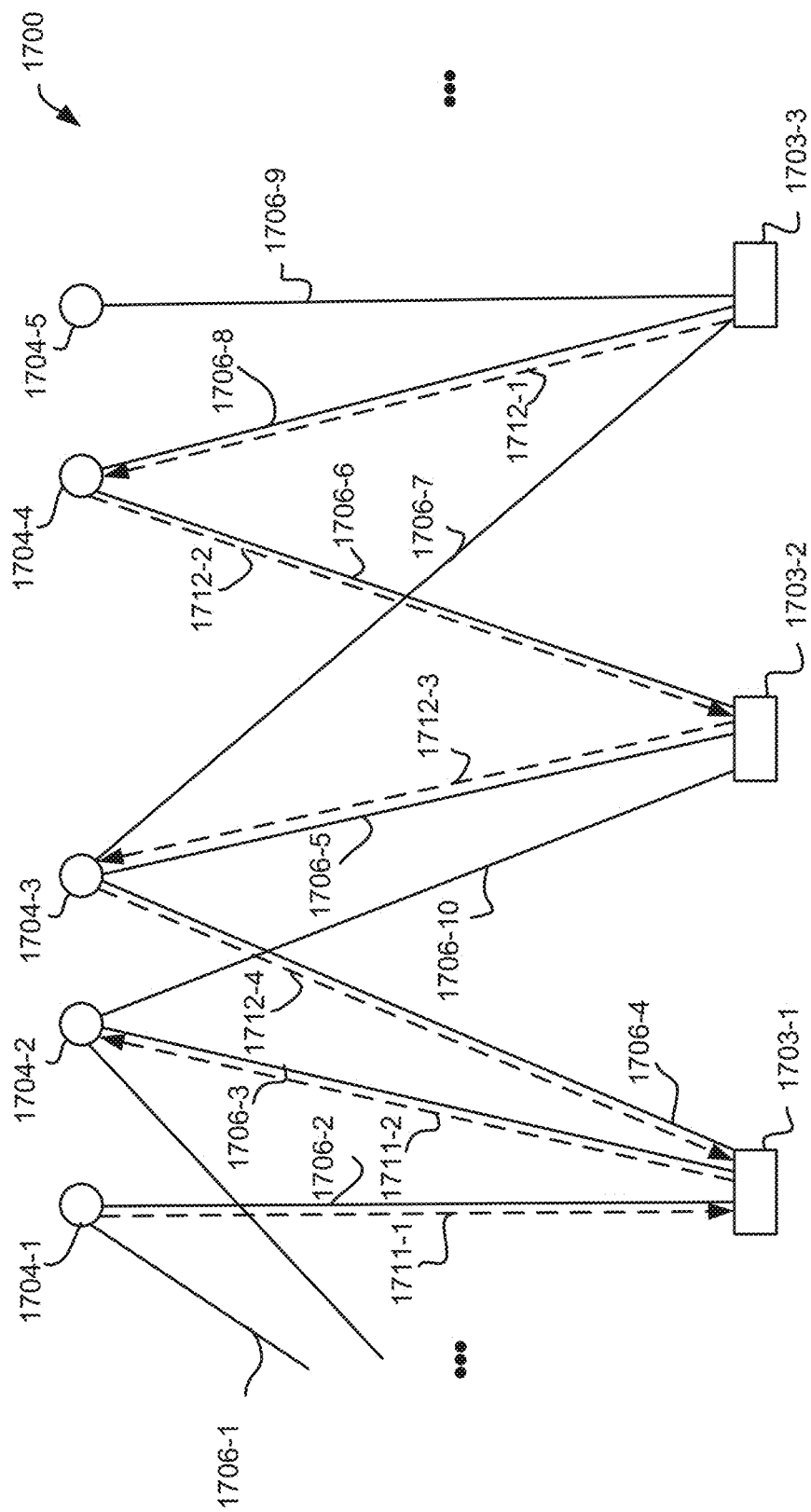
FIG. 17 is a block diagram illustrating an example random walk of a portion of a node graph using weights on queries, according to an implementation.

Referring now to FIG. 17, which illustrates an example of performing random walks through a portion of a node graph 1700 according to a weights on queries approach that may be utilized with a query set that includes more than one query node. A weights on queries approach involves placing different levels of importance on different query nodes in the query set in order for particular query nodes to have different levels of influence on the recommendations that are ultimately provided.

First nodes 1703-1, 1703-2, and 1703-3 represent collections. Second nodes 1704-1 through 1704-5 represent representations. Edges 1706-1 through 1706-9 represent associations between collections and representations. First paths 1711-1 and 1711-2 represent paths through the portion of the node graph 1700 by a first random walk. Second paths 1712-1 through 1712-4 represent paths through the portion of the node graph 1700 by a second random walk.

In this example, a query includes first node 1703-3 and second node 1704-1 because a user has selected or otherwise indicated a collection corresponding to the first node 1703-3 and a representation corresponding to the second node 1704-1. Weights that are indicative of relative levels of importance may be determined for the first node 1703-3 and the second node 1704-1. These weights for nodes in a query set (also referred to herein as "query nodes") may indicate an amount of influence that walks initiated from the query node will have on the visit count, proximity scores, and/or recommendations that are ultimately provided. Weights for the query nodes may be determined by various data, such as creation dates that indicate a date that a corresponding collection was created or a date a representation was added to a collection data set, modification date indicating a date that a representation was associated with collection, number of edges connected to a query node, amount of times that a corresponding representation has been added to a collection in a given time period, etc. In this example, relatively more weight is allocated to first node 1703-3 with respect to second node 1704-1. In one or more implementations, greater weight may be allocated to query nodes that have been selected more recently by the user because more recently selected query nodes may better indicate the user's current interests compared to older query nodes. In some implementations, greater weight may be allocated to query nodes that have been more recently created or updated because their content is fresher and may be associated with content that has not previously been presented to the user. In one or more implementations, greater weight may be allocated to query nodes that are connected to more edges because such nodes may provide more paths for random walks to traverse. In some implementations, it may be desirable for greater weight to be allocated to query nodes that have historically had low interaction because such nodes are more likely to be connected to nodes that correspond to content that is new and/or rare. A function may be used to inversely weigh query nodes in a query based on amounts of historical interaction. Low interaction may be indicated by the number of connections (i.e. edges) to a node, i.e., lower amounts of connections indicates a lower level of interaction. Low amounts of interaction may be indicated by tracking an amount of user views of content corresponding to a node. High interaction may be indicated by the number of connections (i.e. edges) to a node, i.e., higher amounts of connections indicates a higher level of interaction. Like low amounts of interaction, high amounts of interaction may be indicated by tracking an amount of user views of content corresponding to a node.

Different weights may be implemented in various ways. In some implementations, walk lengths (max amount of steps/walk) may be assigned to each node. More weight may be allocated to a query node by allocating longer walk lengths to the query node. Less weight may be allocated to a query node by allocating shorter walk lengths to the query node. Initiating random walks with longer walk lengths from a query node results in nodes around the query node getting more visits. In some implementations, different weights may be implemented by assigning different amounts of walks to query nodes. For example, a first query node that is desired to have a greater weight may be assigned twice the number of walks as a second query node that is desired to have a lesser weight. In this example, two random walks are initiated from the first query node 1703-3 for every one random walk that is initiated from the second query node 1704-1. The query node from which more walks are initiated may have more influence on the recommendation that is ultimately provided because nodes around that query node get more visits and, thus, have higher visit counts and/or proximity scores.

Still referring to FIG. 17, in this example, first node 1703-3, which in this example is a query node, has been assigned a walk length of up to two steps and second node 1704-1, which in this example is also a query node has been assigned a walk length of up to four steps because it has been determined that first node 1703-3 should have less influence on the recommendation that is ultimately formulated than the second node 1704-1.

In this example, a first random walk is initiated from second node 1704-1. At second node 1704-1 there are two edges, i.e., 1706-1 and 1706-2. An edge is chosen and the walker walks along the chosen edge in the next step. In this example, the walker follows path 1711-1 along edge 1706-2 to first node 1703-1 and the visit count for the first node 1703-1 is increased accordingly. At first node 1703-1 there are three edges, i.e., 1706-2, 1706-3, and 1706-4. An edge is chosen and the walker walks along the chosen edge in the next step. In this example, the walker follows first path 1711-2 along edge 1706-3 to second node 1704-2 and the visit count for the second node 1704-2 is incremented accordingly. The first random walk terminates at the second node 1704-2 because the walk length (max amount of steps/walk) for the first walk, i.e., 2 steps, has been reached.

A second random walk is initiated from first node 1703-3. Because the random walk is starting at first node 1703-3, the max amount of steps for the walk is four. At first node 1703-3 there are three edges available, i.e., 1706-7, 1706-8, and 1706-9. An edge is chosen and the walker walks along the chosen edge in the next step. In this example, the walker follows path 1712-1 along edge 1706-8 to second node 1704-5, and the visit count for the second node 1704-5 is incremented accordingly. At second node 1704-5 there are two edges, i.e., 1706-8 and 1706-6. An edge is chosen and the walker walks along the chosen edge in the next step. In this example, the walker follows path 1712-2 along edge 1706-6 to first node 1703-2 and the visit count for the first node 1703-2 is incremented accordingly. From 1703-2, the walker follows path 1712-3 along edge 1706-5 to second node 1704-3 and the visit count for the second node 1704-3 is incremented accordingly. Next, the walker follows path 1712-4 along edge 1706-4 to first node 1703-1. The second random walk terminates at the first node 1703-1 because the walk length (max amount of steps/walk) for the second random walk, i.e. 4 steps, has been reached. This process of random walks from the query node(s) may continue and visit counts for visited nodes incremented until one or more criterion are satisfied.

Figure 18:
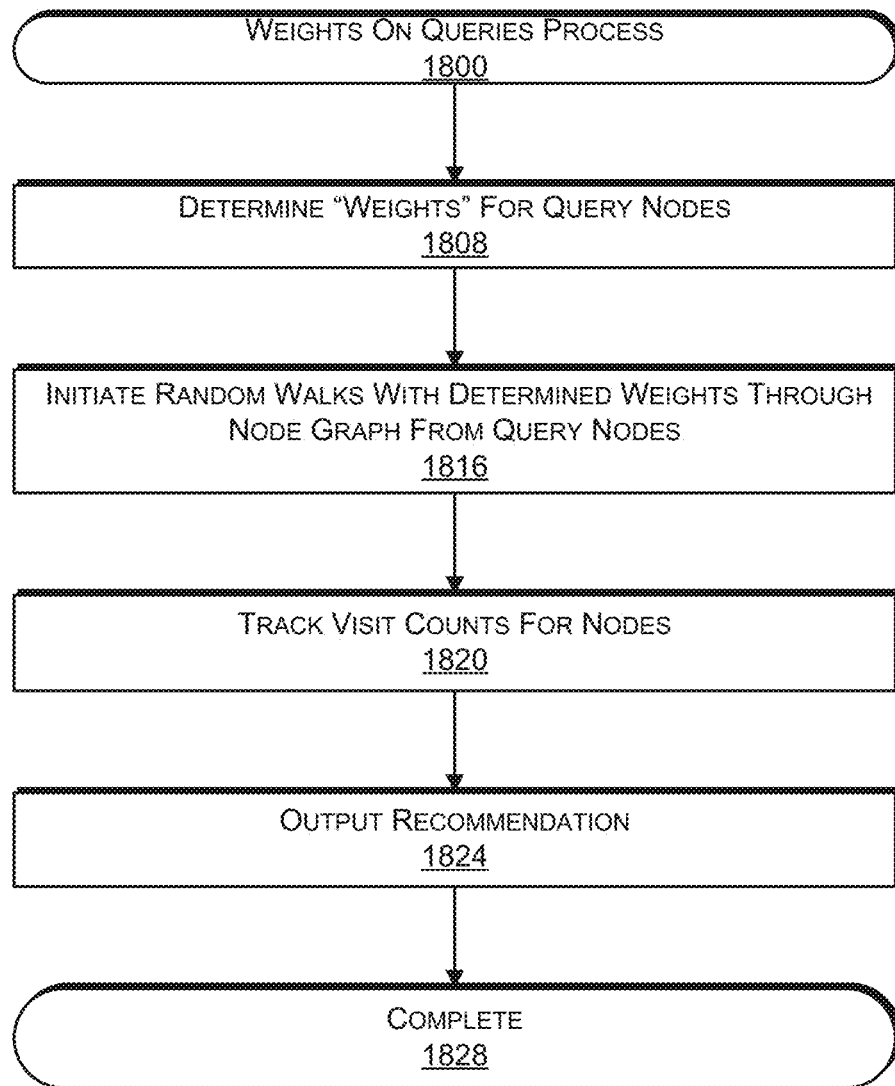
FIG. 18 is a flow diagram illustrating an example process involving a random walk of a portion of a node graph using weights on queries, according to an implementation.

FIG. 18 illustrates an example weight on queries process 1800 for performing random walks through a provided node graph, such as the portion of the node graph 1700 of FIG. 17, according to an implementation. The provided node graph may include first nodes that represent collections, second nodes that correspond to representations (e.g., media objects), and a set of edges that represent associations between collections corresponding to first nodes and representations that correspond to second nodes.

The process 1800 may begin by weights for query nodes being determined, as in 1808. The weights between respective query nodes may be unequal. As discussed above with respect to FIG. 17, weights for query nodes may be determined based on a relative creation date, modification date, number of nodes connected to the node coupled to the query, etc. For example, it may be desirable for nodes in the query set that have been created, added, or modified within a defined date or time to be given more weight because such nodes may be more likely to correspond to "fresher" content that has not yet been presented to the user. In addition, it may be desirable to add more weight to query nodes with relatively more connections because such query nodes may have more potential paths for random walks to visit. In some implementations, greater weight may be assigned to query nodes that are connected to relatively newer collections because such collections may be fresher and random walks around such nodes are more likely to lead to recommendations of content that has not yet been presented to the user.

Weights for query nodes may be implemented in multiple different ways. For example, weights may be implemented by allocating an unequal number of random walks from different query nodes. For example, if a query includes node1 and node2, x walks may be initiated from node1 and y walks may be initiated from node2. The query node with the higher number of walks is given greater weight because the query node allocated the higher number of walks may have a greater impact on the recommendation that is ultimately formulated. In some implementations, a substantially equal amount of random walks may be initiated from query nodes but they may be weighted by allocating different amounts of steps for random walks that are initiated from each query node. The walk length (max amount of steps/walk) for a walk from a query node is proportional to its weight on the recommendation because a greater amount of steps from a particular query node will likely lead to nodes around the query node getting more visits by the random walks. The amount of walks and/or steps assigned to each query node may be determined based on, for example, an age of the collection or representation corresponding to the query node, creation date of a collection or a representation corresponding to the query node, an amount of edges that are connected to the query node, etc.

In some implementations, a number of steps (N) may be distributed among query nodes according to a formula that takes into account a degree of the query node. The number of steps required to obtain meaningful visit counts may depend on the query node's degree, i.e., the amount of edges that are connected to the query node. For example, recommending from a "popular" second node that is connected to many first nodes may require a higher number of steps than a first node with a relatively smaller degree (less connections). Hence, it may be desirable to scale the number of steps allocated to each query node in proportion to its degree. In one or more implementations, the number of steps is assigned in linear proportion to the degree. For example, a first query node with a degree of four may be allocated twice as many steps as a second query node that has a degree of two. However, if the number of steps is assigned in linear proportion to the degree, some query nodes with low degrees may not be allocated any steps. In one or more implementations, the number of steps is allocated to query nodes based on a function that increases sub-linearly with the node degree and scales the per node weights by a scaling factor ($s_q$). For example, following scaling factor $s_q$ for each second node may be determined using the following equation.

$$s_q = |E(q)| * (C - \log|E(q)|)$$

Where sq is the scaling factor for a query node q, E(q) is the degree of the query node (q), and C is a maximum node degree. The number of steps may be allocated to a query node as follows:

$$N_q = w_q N \frac{s_q}{\sum_{r \in Q} s_r}$$

Where Nq is the total number of steps assigned to the random walks that start from query node q.

In one or more implementations, a first amount of nodes that are associated with a first query node in query subset and a second amount of nodes that are associated with a second query node in a query subset may be determined. A first walk length may be determined for walks initiated from the first query node and based at least in part on the first amount, and a second walk length may be determined for walks initiated from the second query node and based at least in part on the second amount. For example, the first walk length may be proportional to the first amount, and the second walk length may be proportional to the second amount. Random walks initiated from the first query node may traverse no more nodes than the first walk length, and random walks initiated from the second query node may traverse no more nodes than the second walk length.

A plurality of random walks may be initiated from query nodes, as in 1816. The plurality of random walks may be in accordance with the determined weights. For example, if query nodes are weighted by step count, the random walks may be performed from the query nodes, or more walks may be performed that are initiated from one query node compared to another.

The nodes in the node graph that are visited by the random walks may be tracked as visit counts for those nodes, as in 1820. For example, visit counts for visited nodes may be tracked by a recommendation system. The visited nodes may be tracked by incrementing the visit count for the node. In one or more implementations, the visit counts may be used to determine a corresponding proximity score for each node, the proximity scores indicating a relevance of nodes in the node graph to the query.

A recommendation indicating one or more nodes may be returned, as in 1824. The recommendation may be determined based on the visit counts or proximity scores. In one or more implementations, the recommendation is determined after the random walks are completed. The random walks may complete, for example, if a stopping condition is met. For example, the early stopping method discussed in connection with FIG. 12 may be used to determine to end the random walks. Once the random walks have completed, the recommendation may be determined and include nodes with the highest proximity scores. Once the recommendation has been returned, the process 1800 completes as in 1828.

Figure 19:
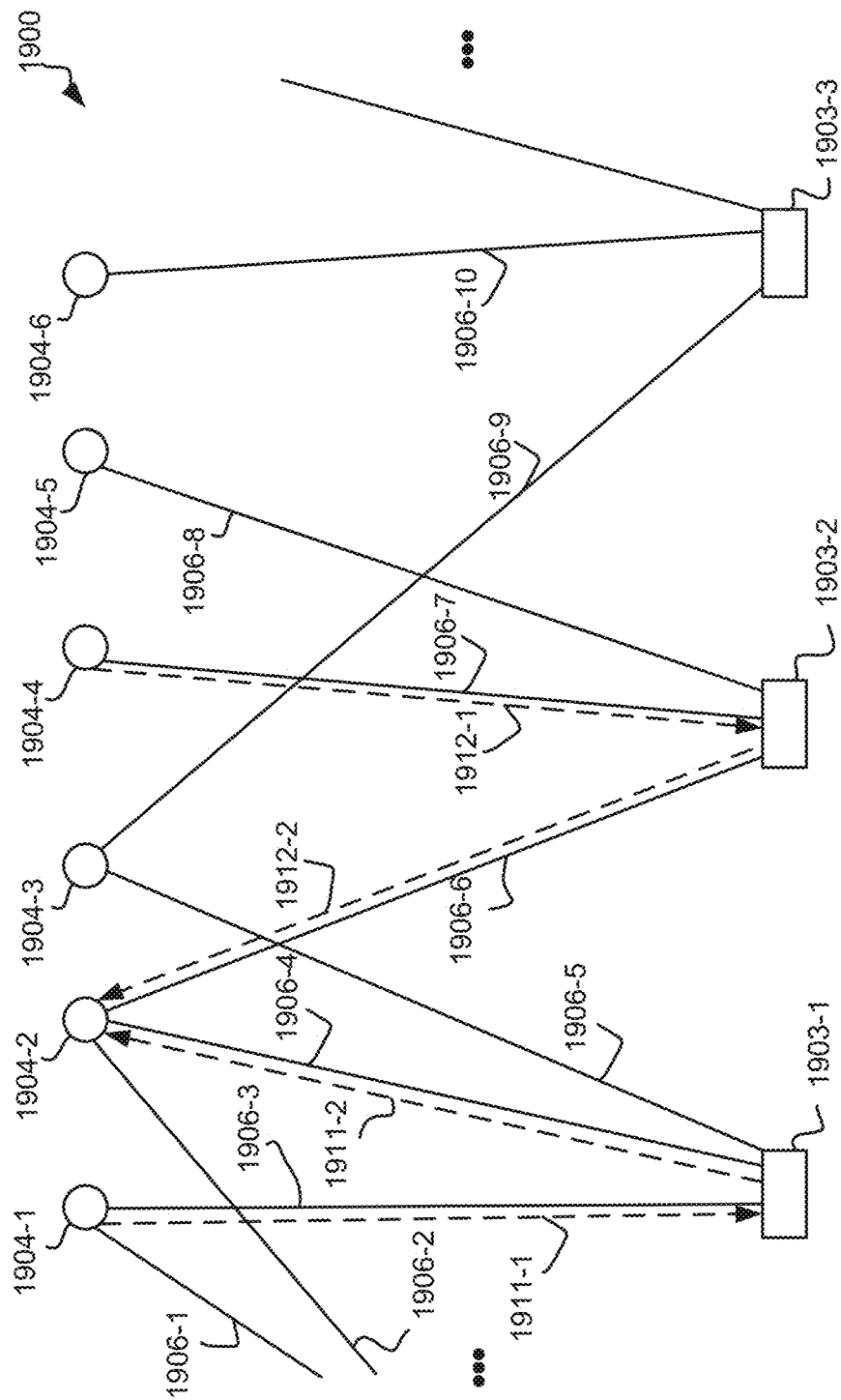
FIG. 19 is a block diagram illustrating an example random walk of a portion of a node graph using visit count boosting, according to an implementation.

Now referring to FIG. 19, which illustrates an example plurality of random walks through a portion of a node graph 1900 that use a multi-hit booster implementation to increase a proximity score of nodes that have been visited by random walks originating from multiple query nodes. Nodes that have been visited by random walks originating from multiple query nodes may be more relevant to a query than nodes that have only been visited by walks originating from a single query node.

As shown in FIG. 19, first nodes 1903-1 through 1903-3 may correspond to collections in a collection data set. Second nodes 1904-1 through 1904-6 may correspond to representations in a collection data set. Edges 1906-1 through 1906-10 represent associations between collections and representations in the collection data set. Paths 1911-1 and 1911-2 represent a path of a walker on a first walk through the node graph 1900. Paths 1912-1 and 1912-2 represent a path of a walker on a second walk through the node graph 1900.

In this example, a query includes second nodes 1904-1 and 1904-4. The query set may be determined based at least in part on a user expressing interest in representations corresponding to second nodes 1904-1 and 1904-4. A first random walk is initiated from second node 1904-1. First node 1903-1 and second node 1904-2 are visited by the first random walk. A second random walk is initiated from second node 1904-4. First node 1903-2 and second node 1904-2 are visited by the second random walk.

In this example, a visit count for second node 1904-2 may indicate a visit by the first random walk and a visit by the second random walk. For example, the visit count for the second node 1904-2 may be two, and the visit count for first nodes 1903-1 and 1903-2 may be one. In some implementations, the visit count for second node 1904-2 may be further incremented or increased beyond the two visits combined from the first random walk and the second random walk because both the first random walk and the second random walk visited the second node 1904-2. In other implementations, visit counts for nodes may be used to determine proximity scores for nodes. For example, the proximity score for the second node 1904-2 may be a sum of the total visits and a number of random walks from different query nodes. In the present example, the proximity score for the second node 1904-2 may be four because the second node 1904-2 was visited by walks that originated from two different query nodes. Similarly, the proximity score for the first nodes 1903-1 and 1903-2 may be two because these nodes were each visited by one walk from one query node. As discussed in more detail with respect to FIG. 20, various formulas may be utilized to increase the visit count or proximity score for nodes visited by random walks originating from multiple query nodes.

Figure 20:
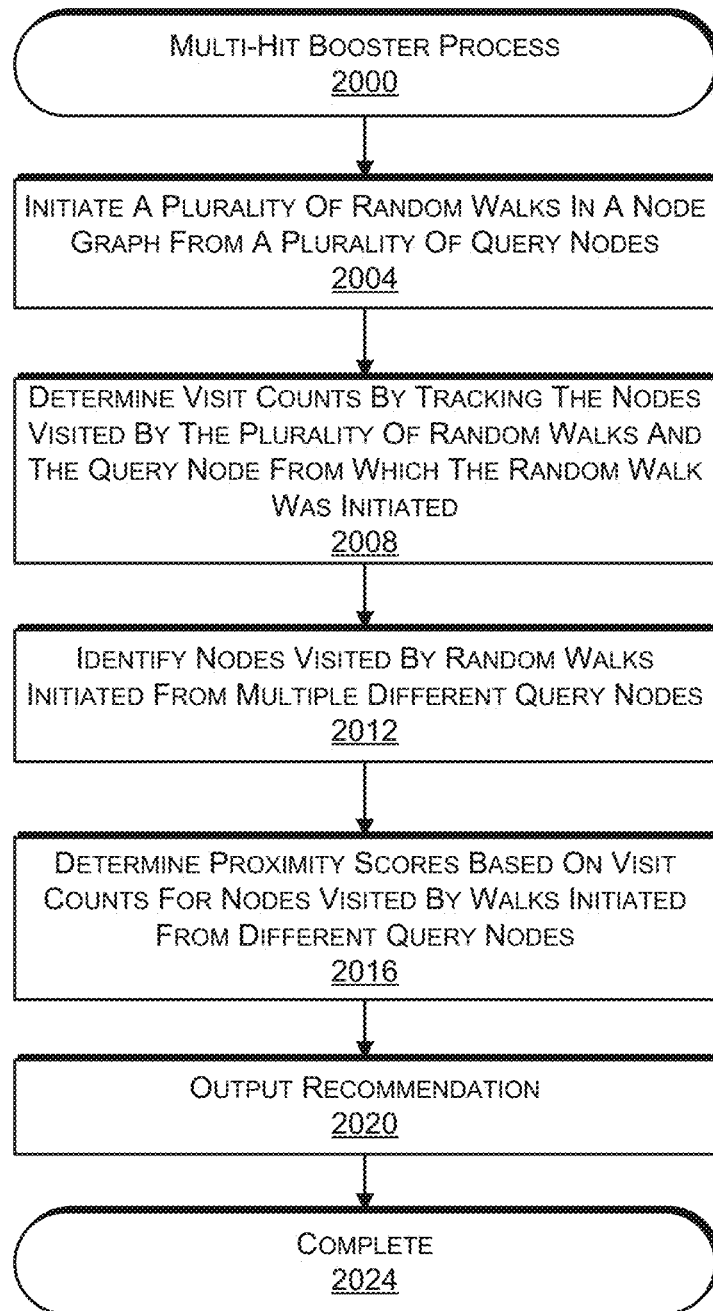
FIG. 20 is a flow diagram illustrating an example process involving a random walk of a portion of a node graph with visit count boosting, according to an implementation.

FIG. 20 illustrates an example multi-hit booster process 2000 for formulating content recommendations, according to an implementation. The example process 2000 may be utilized in situations where random walks are initiated from multiple different query nodes. The process 2000 begins by a plurality of random walks being initiated from a plurality of query nodes, as in 2004. In one or more implementations, the random walks may have different walk lengths (maximum amount of steps/walk) and/or different amounts of walks may be allocated to different query nodes. The random walks may proceed until a stopping condition has been met. For example, aspects of an early stopping process 1200 discussed in connection with FIGS. 11 and 12 may be incorporated into process 2000.

Visit counts may be determined by tracking nodes in the node graph that have been visited by the plurality of random walks and the query node from which the visit was initiated, as in 2008. As the random walks traverse the node graph, a recommendation service may track the nodes visited by the random walk and increment their visit counts accordingly.

Nodes in the node graph that have been visited by random walks initiated from different query nodes may be identified, as in 2012. Nodes visited by random walks initiated from different query nodes may be more relevant to a query than nodes with an equivalent amount of visits initiated from walks from a single query node. For example, if there are two query nodes and random walks from those query nodes each cross through the same node, that node will be considered more relevant to the query than nodes crossed by random walks from only one of the query nodes. In some implementations, nodes that have been visited by random walks that have been initiated from different query nodes may be identified while random walks traverse the node graph. In some implementations, such nodes are identified after the random walks have terminated. It may be desirable to identify such nodes while random walks are being performed if an early stopping process is used to terminate the running of the random walks through the node graph, and the early stopping process relies on a real-time visit count and/or proximity score to determine whether a stopping condition is satisfied.

In some implementations, proximity scores for nodes in the node graph may be determined based on visit counts for nodes in the node graph and based on the amount of visits to the node by walks initiated from different query nodes, as in 2016. Nodes that are visited by walks initiated from two different query nodes may be more relevant than nodes that have been visited only by one or more walks initiated from a single query node. In one or more implementations, a proximity score function may be applied that provides an increased proximity score for nodes that are visited by walks initiated from different query nodes. In some implementations, a proximity score function may be applied that provides a decreased proximity score for nodes that are visited only by walks initiated from a single query node. For example a proximity score may be determined by taking a sum of a square root of a corresponding visit count and then applying an exponential function, e.g., base two. In one or more implementations, proximity scores for nodes may be determined based on the equation following:

$$V[p] = \left( \sum_{q \in Q} \sqrt{V_q[p]} \right)^2$$

In the above equation, V[p] is a proximity score for a node p, q is a query node, $v_q[p]$ is a visit count for the node, and Q is a set of query nodes. If a node in the node graph is visited by walks from only a single query node, then the proximity score V[p] for the node p may be the visit count $v_q[p]$ for the node p. Other formulas or methods may be used to determine proximity scores in a way that gives higher proximity scores to nodes that have been visited by random walks that have been initiated from different query nodes. For example, nodes that have only been visited by walks from a single node may be identified and a proximity score may be calculated for these nodes that is lower than the visit count for the node. In this example, proximity scores for nodes that have been visited by random walks from multiple query nodes may be equal to the visit count for the node. Proximity scores and visit counts for nodes in the node graph may be maintained in real-time by a collection management system as random walks traverse through the node graph.

After completion of the random walks, a recommendation may be output, as in 2020. The recommendation may be determined based at least in part on an identification of nodes with the highest corresponding proximity scores or highest visit counts. Depending on the query, a recommendation may include only nodes that correspond to collections or only nodes that correspond to representations. For example, if the query includes only nodes that correspond to collections, then a recommendation may be limited to nodes that correspond to collections. The recommendation may be sent for presentation on a user device. Upon completion of the recommendation being output at 2020, the process 2000 may complete, as in 2024.

Figure 21:
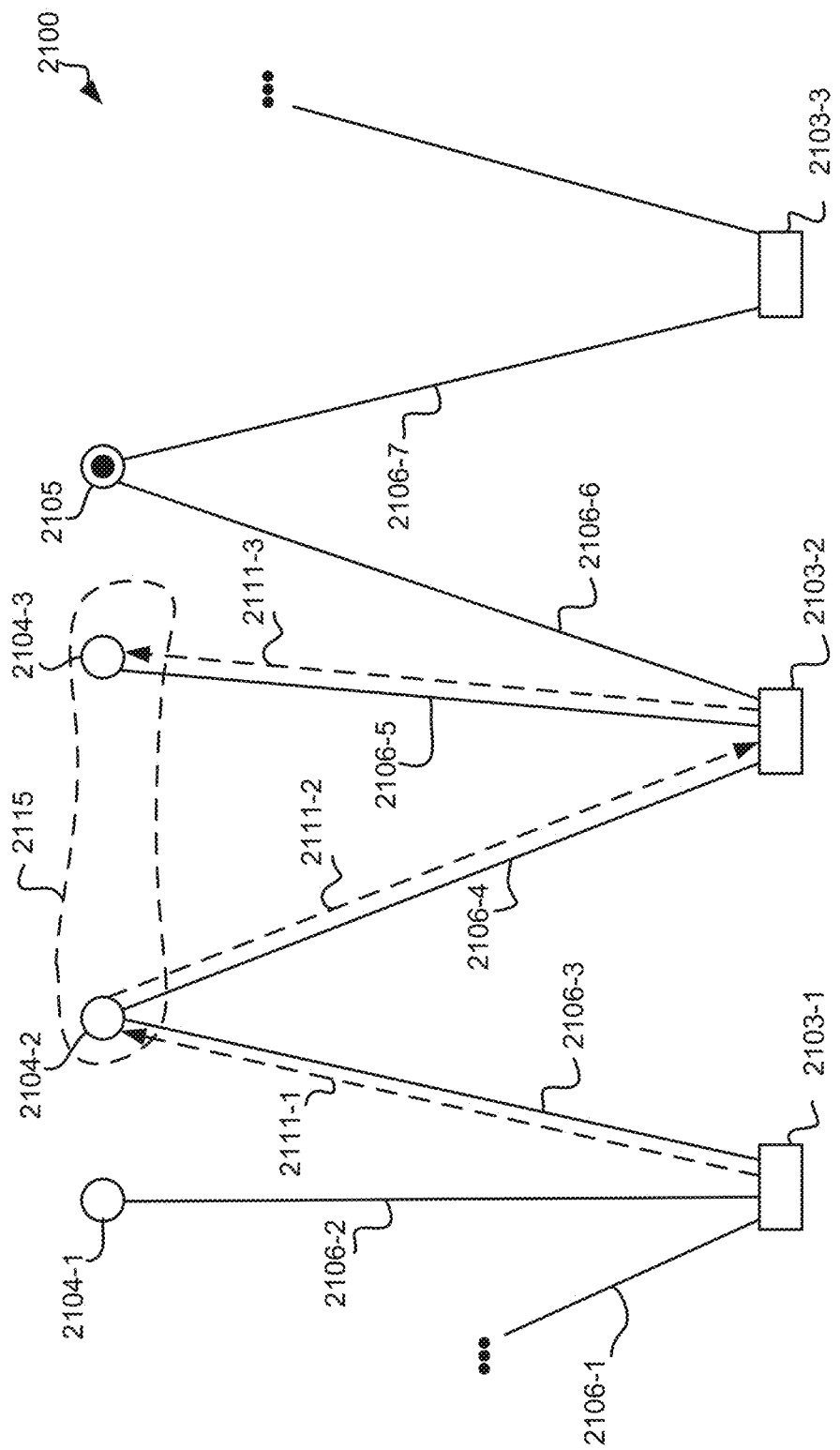
FIG. 21 is a block diagram illustrating an example random walk of a portion of a node graph using clustering, according to an implementation.

FIG. 21 illustrates an example of a random walk through a portion of a node graph 2100 where proximity scores or visit counts for nodes in the node graph may be determined using a clustering process, according to an implementation. The clustering process may involve increasing a visit count or proximity score for one or more "target nodes" of the node graph 2100 for each visit to another node that is included in a "cluster" or a designated subset of nodes of the node graph 2100. The clustering process may improve the likelihood that particular content corresponding to the target node will be recommended from the random walk process.

The node graph 2100 may be a model of at least a portion of a collection data set. The portion of the node graph 2100 includes first nodes 2103-1 through 2103-3 that represent collections of a collection data set and second nodes 2104-1 through 2104-3 that correspond to representations of the collection data set. The portion of the node graph 2100 also includes edges 2106-1 through 2106-7 that represent associations in the collection data set between collections corresponding to the first nodes and representations corresponding to the second nodes 2104-1 through 2104-3. Paths 2111-1 through 2111-3 represent a route taken by a walker on a random walk through the portion of the node graph 2100.

In this example, target node 2105 corresponds to a representation in the collection data set. In this example, cluster 2115 includes second nodes 2104-2 and 2104-3. In other implementations, a target node may correspond to a collection, or may include multiple nodes that correspond to collections and representations. In one or more implementations, the cluster 2115 may include first nodes corresponding to collections.

A target node and a cluster may be selected or determined based on a variety of considerations. For example, the target node may be a representation that is an advertisement or content for which a provider of a recommendation service is paid a fee for each presentation of the representation to a user. The clustering process may increase the visit count for the target node or determine a proximity score using a method that favors the target node in order to increase the likelihood that content corresponding to the target node will be included in recommendations that are provided to the user. As another example, the clustering process may increase the likelihood that a target node will be returned as part of a recommendation with other nodes of the cluster. In some implementations, more than one target node may be selected, e.g., a subset of nodes (e.g., 0.1% or 5%) in the graph may be target nodes. For example, if it is desired to recommend advertisements, multiple nodes of a node graph that correspond to advertisements may be target nodes. Similarly, if it is desired to recommend content that is new, multiple newer nodes of the node graph may be specified as target nodes. Other characteristics, such as topic score, context, constraints, source, type of object, amount of views, description, etc., may be used to determine target nodes.

In some implementations, the nodes included in the cluster may be determined based on proximity or degrees to the target node. For example, each node that is connected by a defined amount of edges may be included in the cluster. In some implementations, the cluster may be independent of proximity to a target node. In some implementations, the cluster may be based at least in part on popularity. For example, nodes corresponding to the most popular content as indicated by user view may be included in the cluster. In some implementations, the cluster may be based on similar keyword pairs or topic scores with respect to the one or more target nodes. In some implementations, the cluster may be determined based on comparing URLs associated with content in the collection data set with a URL associated with the target node to identify nodes with URLs similar to the target node. Nodes corresponding to content associated with similar URLs may be included in the cluster. In some implementations where the nodes correspond to images, the cluster may be determined to be those nodes that correspond to images that are visually similar to a target node. Such determination may be made via image processing. Nodes may also be included in multiple different clusters and, in some implementations, multiple target nodes may be selected, each target node having a corresponding cluster.

In this example illustrated in FIG. 21, a random walk may be initiated from first node 2103-1. At first node 2103-1 there are three edges, i.e., edges 2106-1, 2106-2, and 2106-3. In this example, the walker follows path 2111-1 along edge 2106-3 to second node 2104-2. From the second node 2104-2, the walker follows path 2111-2 to first node 2103-2 and then follows path 2111-3 to second node 2104-3 where the walk terminates. In this example, a visit count for the target node 2105 may be incremented for each visit to nodes included in the cluster 2115. Accordingly, the visit count for the target node 2105 for the random walk is two. In implementations, visit counts indicate only actual visits by the random walks to the node. In such implementations, one or more proximity scores corresponding to the target node may be incremented for visits to the cluster.

Figure 22:
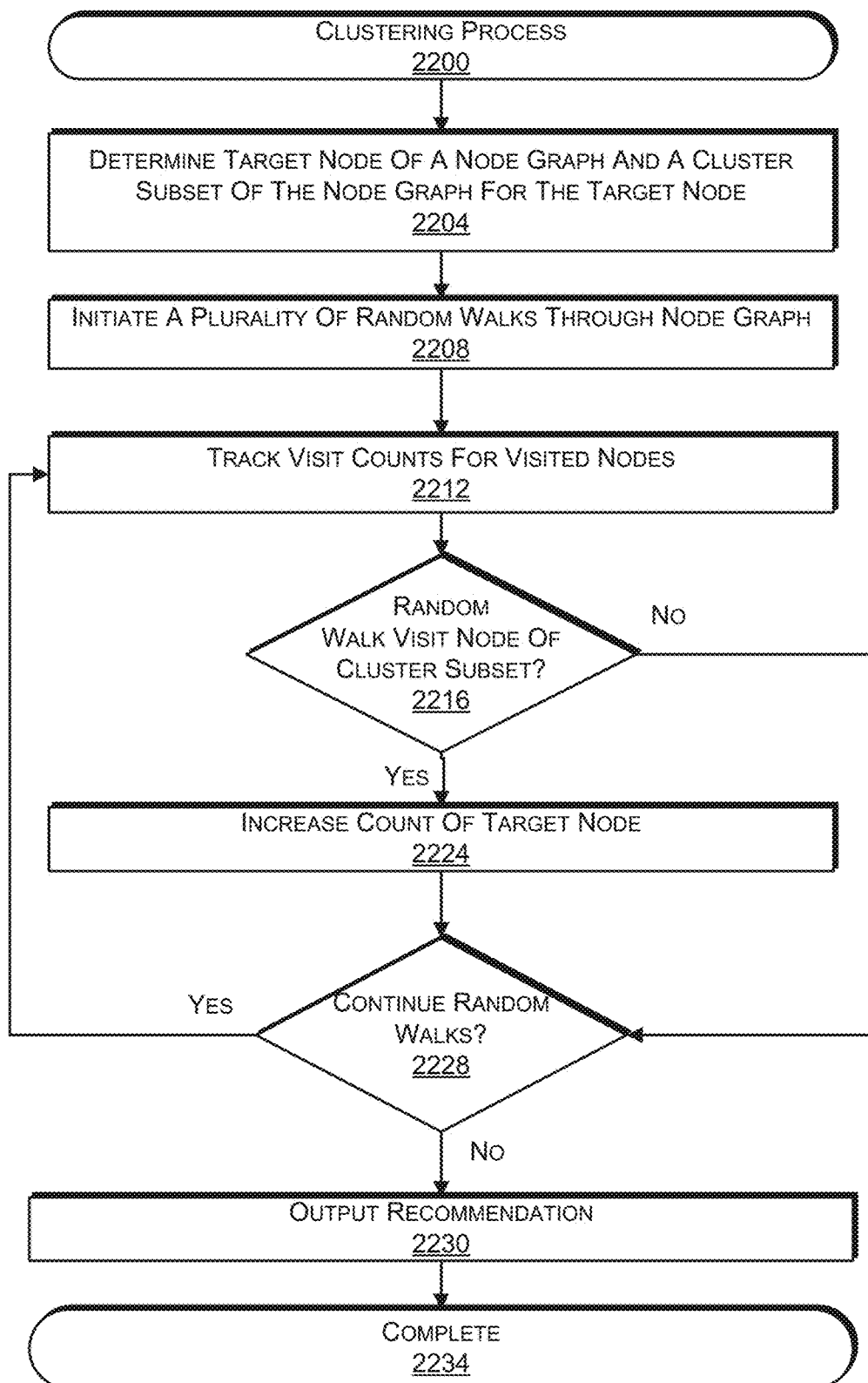
FIG. 22 is a flow diagram illustrating an example process involving a random walk of a node graph using clustering, according to an implementation.

FIG. 22 illustrates an example clustering process 2200 for identifying a recommendation for a query set, according to an implementation. The example clustering process 2200 may begin by determining a target node of the node graph and a cluster subset of the node graph for the target node, as in 2204. Target nodes may correspond to representations that are to be promoted or given more weight. Target nodes may be determined, for example, based on one or more properties or characteristics as indicated in the collection data or by analyzing their content, e.g., processing a representation or description. For example, target nodes may be nodes that are trending, e.g., added to many collections, advertisements, and/or are old, new, have certain topic scores, etc. In some implementations, a target node may be a node from a particular source, such as an advertiser that desires to promote a particular representation. For example, a target node may be determined by analyzing the collection data for advertisements that have at least a defined age and that have at least a defined amount of associations with collections.

As discussed above with respect to FIG. 22, a cluster for the target node may be determined by degree and/or other factors. For example, the cluster may include all second nodes that are within two degrees of the target node. In one or more implementations, the cluster subset for a target node may include all second nodes in collections that include the target node. In other implementations, the cluster subset is determined by identifying second nodes that are associated with similar URLs or descriptions as the target node. In some implementations involving images, a cluster may be determined to be a set of nodes that are visually similar to a target node. Likewise, nodes in the cluster may be determined based at least in part on one or more of the nodes including a similar object or being associated with a particular language or geographic location of the target node. In some implementations, the cluster may be determined based on user characteristics. For example, if a target node is associated with married females aged 50-60, the cluster may include nodes that are associated with such users.

A plurality of random walks in the node graph may be initiated, as in 2208. In one or more implementations, walks may be initiated from different query nodes. For example, some walks may be initiated from a first query node, and other walks may be initiated from a second query node. As discussed in detail in connection with FIGS. 17 and 18, the query nodes may be given different weights.

The number of times a node is visited by the plurality of random walks may be tracked as a visit count for the node, as in 2212. In one or more implementations, proximity scores for each visited node may be derived based on the respective visit counts. The proximity scores may indicate a relevance of the visited nodes with respect to the query.

If it is determined at 2216 that a random walk has visited a node that is included in the cluster subset, in 2224 a visit count or proximity score corresponding to the target node is increased an amount corresponding to a visit, e.g., by one. If it is determined that a node of the cluster subset has not been visited by a random walk, the process 2200 proceeds to 2212 and the process continues.

If it is determined at 2228 that the random walks should not continue, a recommendation may be determined and output, as in 2230. In one or more implementations, the random walks should not continue if an end condition has been met, e.g., a defined number of walks through the node graph has occurred, or early stopping, as discussed in connection with FIG. 12, has occurred. If it is determined at 2228 that the random walks should continue, the process 2200 returns to 2212 where the nodes visited by random walks are tracked.

The recommendation may be determined based on visit counts or proximity scores. For example, the recommendation may be determined as discussed in connection with FIG. 12. In implementations where proximity scores are based on the visit counts, the recommendation may be determined from the proximity scores. For example, the recommendation may include the nodes with the highest proximity scores. The recommendation set may be output to a user device for presentations. Once the recommendation set 2230 has been output, the process may complete as in 2234.

As will be appreciated, one or more of the above implementations may be used alone or in combination to determine recommendations in response to a query. Likewise, by representing a data set as a node graph, pruning the node graph, and walking the graph to determine recommendations, the accuracy of returned recommendations is improved because potentially non-relevant nodes are removed (pruned). Likewise, because the node graph is reduced, the time and computation cost to determine the recommendations is decreased, thereby providing a technological improvement over existing systems.

While the above examples describe generating a node graph from a data set and then pruning the node graph, in other implementations, the data set may be pruned and then the node graph may be generated.

The concepts disclosed herein may be applied within a number of different devices and computer systems, including, for example, general-purpose computing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the art should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly," "similar," or "substantially" as used herein, represent a value, amount, or characteristic close to the stated value, amount, or characteristic that still performs a desired function or achieves a desired result. For example, the terms "about," "approximately," "generally," "nearly," "similar," or "substantially" may refer to an amount that is within less than 10% of, within less than 5% of, within less than 1% of, within less than 0.1% of, and within less than 0.01% of the stated amount.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
   under control of one or more computing systems configured with executable instructions,
   determining a plurality of collections, each collection having associated therewith one or more media objects;
   determining a plurality of media objects, each media object of the plurality of media objects associated with at least one collection of the plurality of collections;
   for each media object of the plurality of media objects, determining a media object topic score indicative of a characteristic of content of the respective media object;
   for each collection of the plurality of collections:
   determining a subset of media objects of the plurality of media objects that are associated with the respective collection; and determining a diversity score for the collection based at least in part on the media object topic scores of the subset of media objects, the diversity score indicative of a diversity of the subset of media objects associated with the respective collection;

determining a first sub-plurality of collections of the plurality of collections having diversity scores that satisfy a criterion, wherein the first sub-plurality of collections is less than the plurality of collections; and forming a reduced diversity data set that:
  includes the first sub-plurality of collections;
  includes a set of media objects associated with one or more of the first sub-plurality of collections; and
  excludes collections having diversity scores that do not satisfy the criterion.

2. The computer-implemented method of claim 1, further comprising:

generating a bipartite graph based at least in part on the reduced diversity data set, wherein the bipartite graph includes:
  a first set of nodes, each node in the first set of nodes representing a respective collection of the first sub-plurality of collections;
  a second set of nodes, each node in the second set of nodes representing a respective media object of the set of media objects; and
  a set of edges, each edge in the set of edges representing a respective association between a first node of the first set of nodes and a second node of the second set of nodes.

3. The computer-implemented method of claim 2, further comprising:

receiving a query that includes at least one media object included in the set of media objects;

generating a recommendation at least in part by performing a plurality of random walks through the bipartite graph, wherein the recommendation includes at least one second media object included in the set of media objects; and sending the recommendation to a user device.

4. The computer-implemented method of claim 1, further comprising:

receiving, from a user device, a media object, wherein the media object includes an annotation and a representation;

receiving, from the user device, a request to add an association between the media object and a collection in the plurality of collections;

including the media object in the plurality of media objects; and establishing an association between the media object and the collection.

5. The method of claim 4, further comprising:

determining, at least in part by applying a topic model to the annotation, a media object topic score for the media object;

determining a collection topic score for the collection;

determining a similarity score based at least in part on the collection topic score of the collection and the media object topic score of the media object;

determining that the similarity score meets a similarity score criterion; and including the media object in the set of media objects.

6. A computer-implemented method of reducing a corpus of user-specified collections of media objects, comprising:

under control of one or more computing systems configured with executable instructions, determining a plurality of collections;

determining a plurality of media objects, each media object of the plurality of media objects associated with at least one collection of the plurality of collections;

determining a first media object topic score for a first media object of the plurality of media objects, wherein the first media object topic score is indicative of a first characteristic of content of the first media object;

determining a second media object topic score for a second media object of the plurality of media objects, wherein the second media object topic score is indicative of a second characteristic of content of the second media object;

determining a first association between the first media object and a first collection of the plurality of collections;

determining a second association between the second media object and the first collection;

determining, based at least in part on the first media object topic score and the second media object topic score, a first collection topic score for the first collection, wherein the first collection topic score is indicative of a third characteristic of content of the first collection;

determining a first similarity score based at least in part on the first media object topic score and the first collection topic score, wherein the first similarity score indicates a degree of similarity between content of the first collection and content of the first media object, wherein the content of the first collection includes the first media object and the second media object;

determining that the first similarity score does not meet a similarity criterion; and generating a modified data set based at least in part on the plurality of collections, the plurality of media objects, and the determination that the first similarity score does not meet the similarity criterion, wherein the modified data set excludes at least from the modified data set.

7. The computer-implemented method of claim 6, further comprising:

generating a bipartite graph based at least in part on the modified data set; and wherein the bipartite graph includes:
  a first set of nodes, each node in the first set of nodes representative of a collection of the plurality of collections;
  a second set of nodes, each node in the second set of nodes representative of a media object of the plurality of media objects; and
  a set of edges, each edge in the set of edges representative of an association between a first node of the first set of nodes and a second node of the second set of nodes.

8. The computer-implemented method of claim 7, further comprising:

receiving a query that includes a sub-plurality of media objects of the plurality of media objects;

performing a plurality of random walks through the bipartite graph, wherein at least a portion of the plurality of random walks initiate at a media object of the sub-plurality of media objects;

generating a recommendation based at least in part on the plurality of random walks; and sending the recommendation to a user device for presentation.

9. The computer-implemented method of claim 6, further comprising:

determining an amount of collections in the plurality of collections that are associated with the first media object;

determining that the amount exceeds a threshold; and determining the first media object based at least in part on the amount exceeding the threshold.

10. The computer-implemented method of claim 6, wherein:

the first media object includes an annotation and at least one of a video file, an image, or an audio file; and the annotation is generated based at least in part on a user-provided description of the at least one of the video file, the image, or the audio file.

11. The computer-implemented method of claim 6, further comprising:

determining a second collection of the plurality of collections that is associated with the first media object;

determining a second collection topic score that is indicative of a fourth characteristic of content of the second collection;

determining a second similarity score based at least in part on the second collection topic score and the first media object topic score;

determining that the second similarity score satisfies the similarity criterion; and including the second collection in the modified data set.

12. The computer-implemented method of claim 6, further comprising:

determining a subset of collections of the plurality of collections that are associated with the first media object, wherein the subset of collections includes a second collection;

determining an association date that is representative of a date when the first media object was associated with the second collection;

determining that the association date exceeds an age threshold; and excluding the second collection from the modified data set.

13. The computer-implemented method of claim 6, wherein the modified data set includes collections of the plurality of collections and media objects of the plurality of media objects having a reduced diversity.

14. A computer system for reducing diversity of collections of media objects, comprising:

one or more processors;

one or more non-transitory computer readable medium storing program instructions that when executed by the one or more processors cause the one or more processors to at least:

determine a first media object of a plurality of media objects;

determine a second media object of the plurality of media objects;

determine a first media object topic score for the first media object, wherein the first media object topic score is representative of a first characteristic of content of the first media object;

determine a second media object topic score for the second media object, wherein the second media object topic score is representative of a second characteristic of content of the second media object;

determine a first collection of a plurality of collections, wherein the first collection has associated therewith the first media object by a first association;

determine, based at least in part on the first media object topic score and the second media object topic score, a first collection topic score for the first collection, wherein the first collection topic score is indicative of a third characteristic of content of the first collection;

determine, based at least in part on the first media object topic score and the first collection topic score, a first similarity score indicative of a degree of similarity between content of the first media object and content of the first collection, wherein the content of the first collection includes the first media object and the second media object;

determine that the first similarity score does not meet a similarity criterion; and generate a modified data set based at least in part on the plurality of media objects and the plurality of collections, wherein the modified data set excludes at least the first collection from the modified data set.

15. The computer system of claim 14, wherein the program instructions that when executed by the one or more processors further cause the one or more processors to at least:

generate a bipartite graph based at least in part on the modified data set; and wherein the bipartite graph includes:

a first set of nodes, each node in the first set of nodes representing a collection of the plurality of collections;

a second set of nodes, each node in the second set of nodes representing a media object of the plurality of media objects; and a set of edges, each edge in the set of edges representing an association between a first node of the first set of nodes and a second node of the second set of nodes.

16. The computer system of claim 15, wherein the program instructions that when executed by the one or more processors further cause the one or more processors to at least:

receive a query set that includes a subset of media objects of the plurality of media objects;

perform a plurality of random walks through the bipartite graph;

generate a recommendation based at least in part on the plurality of random walks; and send the recommendation to a user device for presentation.

17. The computer system of claim 14, wherein the program instructions that when executed by the one or more processors further cause the one or more processors to at least:

determine an amount of collections in the plurality of collections that are associated with the first media object;

determine that the amount exceeds a threshold; and determine, based at least in part on the amount exceeding the threshold, the first media object.

18. The computer system of claim 14, wherein:
the first media object includes an annotation and at least one of a video file, an image, or an audio file; and
the annotation is generated based at least in part on a user-provided description of the at least one of the video file, the image, or the audio file.

19. The computer system of claim 14, wherein the program instructions that when executed by the one or more processors further cause the one or more processors to at least:
determine a sub-plurality of collections of the plurality of collections, wherein the sub-plurality of collections includes a second collection, and wherein the second collection is associated with the first media object;
determine a second collection topic score that is indicative of a fourth characteristic of content associated with the second collection;
determine a second similarity score based at least in part on the second collection topic score and media object topic score;
determine that the second similarity score meets the similarity criterion; and
include the second collection in the modified data set.

20. The computer system of claim 14, wherein the program instructions that when executed by the one or more processors further cause the one or more processors to at least:
determine a sub-plurality of media objects associated with a second collection;
determine topic scores for each media object of the sub-plurality of media objects;
determine a diversity score for the second collection based at least in part on the topic scores determined for each media object of the sub-plurality of media objects;
determine that the diversity score for the second collection meets a diversity score criterion; and
based at least in part on the diversity score meeting the diversity score criterion, exclude the second collection from the modified data set.

\* \* \* \* \*